US010859038B2

(12) United States Patent
Tamas

(10) Patent No.: US 10,859,038 B2
(45) Date of Patent: Dec. 8, 2020

(54) INTERNAL CARBURETOR PURGING DEVICE AND METHOD OF USE THEREOF

(71) Applicant: Florin Tamas, Park Ridge, IL (US)

(72) Inventor: Florin Tamas, Park Ridge, IL (US)

( * ) Notice: Subject to any disclaimer, the term of this patent is extended or adjusted under 35 U.S.C. 154(b) by 180 days.

(21) Appl. No.: 16/041,797

(22) Filed: Jul. 22, 2018

(65) Prior Publication Data
US 2020/0025153 A1 Jan. 23, 2020

(51) Int. Cl.
*F02M 17/00* (2006.01)
*F02M 17/36* (2006.01)
*F02M 21/02* (2006.01)
*F02M 19/00* (2006.01)

(52) U.S. Cl.
CPC ............ *F02M 17/36* (2013.01); *F02M 19/00* (2013.01); *F02M 21/0242* (2013.01)

(58) Field of Classification Search
CPC ..... F02M 17/36; F02M 19/00; F02M 21/0242
See application file for complete search history.

(56) References Cited

U.S. PATENT DOCUMENTS

| | | | |
|---|---|---|---|
| 709,020 A | 9/1902 | Lahodny | |
| 710,452 A | 10/1902 | Greenman | |
| 723,776 A | 3/1903 | Hurd | |
| 751,348 A | 2/1904 | Schnoor | |
| 754,700 A | 3/1904 | Rehfuss | |
| 768,156 A | 8/1904 | Sneider | |
| 774,406 A | 11/1904 | Tompkins | |
| 778,015 A | 12/1904 | Donnelly | |
| 802,867 A | 10/1905 | Larson | |
| 815,177 A | 3/1906 | Knecht | |
| 895,547 A | 8/1908 | Ferro | |
| 1,584,505 A * | 5/1926 | Bevins | F02B 77/04 134/23 |
| 4,793,950 A * | 12/1988 | Hedlund | F02M 9/06 210/251 |
| 5,124,084 A * | 6/1992 | Eide | F02M 5/12 261/4 |
| 6,729,608 B1 * | 5/2004 | Del Sole | F02M 17/36 141/364 |
| 9,562,495 B1 * | 2/2017 | Tucak | F02M 17/36 |
| 10,465,642 B2 * | 11/2019 | Rotter | F02M 37/0052 |

* cited by examiner

*Primary Examiner* — Steven O Douglas

(57) ABSTRACT

An attachment for purging the inside of the carburetors which is comprised by a tubular device having a carburetor connecting member and quick connect receiver extension. The attachment is connected through the bottom of the carburetor or through the feed fuel line of the carburetor. The attachment is attachable to a quick disconnect fitting which can be connected to a conventional car tire air nozzle or pressurized can with the same fitting as the car tire nozzle. The attachment allows all the jets and passages located on the inside of carburetor to be purged at the same time with multiple short blasts of compressed air or pressurized can solvent but without the carburetor being removed from the engine or taken a part. The same principles can easily be applied to all type carburetors for either a two or four-stroke engine.

14 Claims, 30 Drawing Sheets

How to Install Purge Valve

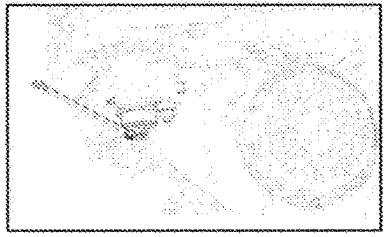
Remove carburetor drain screw

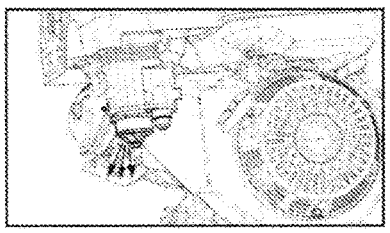
If equipped, turn fuel valve ON. Drain fuel from carburetor and fuel tank

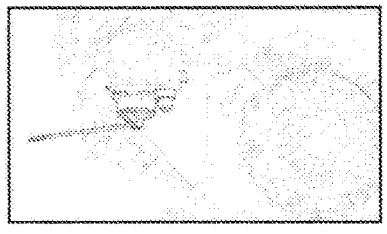
Reinstall drain screw and remove main bowl screw

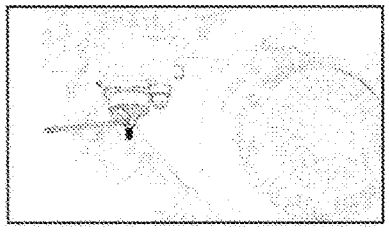
Replace main bowl screw with CleanCarburetor Purge Valve

How to Purge Carburetor

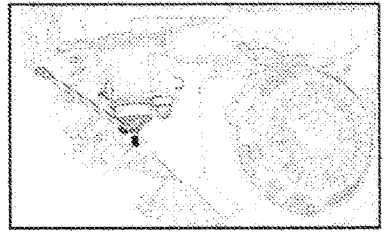
With engine off, remove carburetor drain screw

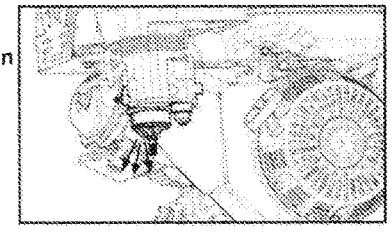
If equipped, turn fuel valve ON. Drain fuel from carburetor and fuel tank

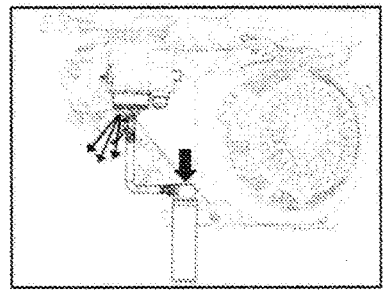
Connect purge can fitting onto purge valve. Blast carburetor 3 times 2 seconds each time

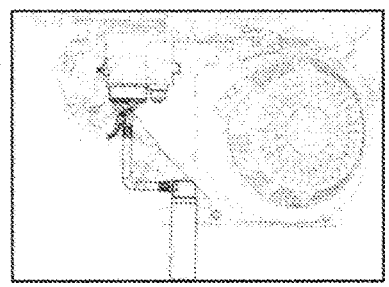
Reinstall drain plug. Blast carburetor 3 more times 2 seconds each time. Disconnect purge can fitting from carburetor

Fig. 5d

INTERNAL CARBURETOR PURGING DEVICE AND METHOD OF USE THEREOF

This application claims the benefit of provisional application #201762536440, filed 24 Jul. 2017.

FIELD OF THE INVENTION

The invention relates to an attachment which is mounted on an engine carburetor and method of purging the inside of the carburetor before the machines are put to storage.

Engines produced to date for use in outdoor power equipment are not designed for gasoline with ethanol (such as E10, E15, E20 and E85); using higher ethanol fuel blends may lead to engine damage and/or performance issues.

During periods of extended storage, ethanol tends to draw in atmospheric moisture which can lead to a build-up of water in the carburetor bowl and fuel tank. Since the carburetor is vented and the moisture in the air is being taken up by the ethanol, new air brings more moisture through to the vent. Inside the carburetor bowl, because the density of water is greater than gasoline, the ethanol/water mixture separates from the gasoline and settles to the bottom of the bowl. Industry refers to this as "Phase Separation" and because the fuel pick-up inside the carburetor bowl is located on the bottom, the first thing sucked up through the jets is the ethanol/water mixture.

On the other hand, the ethanol and water mix in gasoline is a breeding ground for microbes like bacteria and fungi which just adds to the corrosion and debris inside the carburetor bowl. These deposits clog the carburetor jets and fuel and air passages inside the carburetor which is main reason why the engine won't start or operate poorly.

Even if the engine is run dry at the end of the season, there will still be some fuel left in the carburetor. This turns to gum and varnish and dirt and restricts the passages inside the carburetor.

On a brand-new engine can happen too. This is because of the fuel that the factory puts into the carburetor when they are testing it. They then run it dry before the shipping. But, there is always still some fuel inside the carburetor. In all the cases, the carburetors have to be removed from the equipment engines and thoroughly cleaned. The only successful way in bringing the carburetor to a good condition again is to take it all a part and clean it in an ultrasonic cleaner.

DESCRIPTION OF PRIOR ART

Most engine manufacturers recommend using a fuel stabilizer or draining the fuel system before putting the machine into storage.

Most fuel stabilizers form a layer over the top of the gasoline and reduce the rate the fuel's volatile compounds evaporate. They also prevent the absorption of moisture by the fuel. Fuel stabilizer will not prevent but will only retard the separation into more than one phase of gasoline-ethanol solutions in the presence of small amounts of water. Since the stabilizers are effective in the case of a bulk of fuel like the fuel inside fuel tank or carburetor bowl, the stabilizers can't prevent molding inside the carburetor fine passages where film of fuel/ethanol is left after the engine stops running. US Department of Energy's Oak Ridge National Laboratory warns against the use of ethanol with zinc or aluminum carburetors. Additives designed to help prevent phase separation generally contain alcohol which can make the corrosion problem worse.

INDUSTRY NEED

A point of particular interest in this situation is in general use today are quick disconnect attachments for compressed air and other car tires inflatables. These devices are popular because of their simplicity of connection and disconnection and their efficiency of use. However, the devices are not compatible with present day small engines carburetor exterior because of the lack of a quick connect receiver to connect the same to engines carburetors. It would be a significant improvement in the field if such quick disconnect attachments could be used to internally purge the carburetors from remaining fuel and ethanol.

Therefore a need exists for an attachment for small engines carburetors which efficiently purges the interior of the carburetor without taking them a part, is inexpensive, is easy to install, is easily attachable to, and easily disconnectable from compressed air and/or pressurized can. The adapter does not create a carburetor operation problem because ultimately the carburetor retaining screw or drain plug gets replaced with the same type adapter end.

SUMMARY OF THE INVENTION

A quick-connect hookup that includes a connector and an adapter designed for quick and easy assembly and disassembly from a common small engine carburetor bowl retaining screw, carburetor drain plug or carburetor fuel feed line. The adapter is formed with a standardized threaded section on one side and a customized threaded section on the other. The customized threaded section of the adapter is made to fit within an outlet of the small engine carburetor bowl retaining assembly, drain plug or carburetor fuel feed line in substantially permanent manner. The standard section of the adapter includes threads that are made to quickly attach to and detach from a tire chuck type connector (tire inflator nozzle head). On the inside, the adapter contains an one way pneumatic valve (Schrader type valve) and an orifice in series with the one way valve. The invention includes a method of connecting and purging remaining fuel inside the carburetor through a one way valve (Schrader valve) and an orifice with the use of compressed air and cleaning solution and the quick-connect hookup before the machines are put into storage.

1. It is an object of this invention to provide an adapter with one-way valve (purge valve) on inside formed with an external standardized threaded section on one side and a customized threaded section on the other.

2. It is an object of this invention to provide the one-way valve adapter (purge valve) with the external standardized threaded section to fit tire chuck type connector (tire inflator nozzle head).

3. It is an object of this invention to provide the adapter (purge valve) with the external customized threaded section to fit within an outlet of the small engine float type carburetor bowl in substantially permanent manner.

4. It is an object of this invention to provide the adapter (purge valve) with the external customized threaded section to fit within an outlet of the small engine float type carburetor bowl retaining assembly in substantially permanent manner.

5. It is an object of this invention to provide the adapter (purge valve) with the external customized threaded section to fit within an outlet of the small engine float type carburetor bowl drain in substantially permanent manner.

6. It is an object of this invention to provide the adapter (purge valve) with the external customized threaded section to fit within a three-way valve section in substantially permanent manner.

7. It is an object of this invention to provide the adapter (purge valve) with the external customized barb hose section to fit within a small engine carburetor fuel feed hose in substantially permanent manner.

8. It is an object of this invention to provide the purge valve's inside part (valve core) with one-way valve (Schrader type valve) on the inlet side of the purge valve.

9. It is an object of this invention to provide the purge valve's inside part with a flow limiting orifice on the outlet side of the purge valve.

10. It is an object of this invention to provide a disconnect (shut off) of the feed fuel line from fuel tank to carburetor through a permanently installed two-way valve, three-way valve or check valve.

11. It is an object of this invention to provide one-way valve adapter (purge valve) permanently installed through a tee fitting within fuel feed hose from fuel tank to carburetor upstream of the two-way or check valve.

12. It is an object of this invention to install three-way valve into the fuel line from the fuel tank to the carburetor with a purge valve connected to one of the ports of the three-way valve.

13. It is an object of this invention to provide a method of carburetor purging from remaining gasoline and ethanol left inside the carburetor bowl, jets and passages after the fuel has been drained from carburetor or the carburetor has been run dry.

14. It is an object of this invention to provide a method of fuel shut-off valve and fuel lines purging from remaining gasoline and ethanol after the fuel has been drained from the fuel system (carburetor, fuel valve, fuel lines, fuel tank) or the system has been run dry.

15. Another object of this invention is to provide a method for purging the inside of the carburetor bowl, jets and passages without taking the carburetor a part.

16. Another object of this invention is to provide a method for purging the inside of the carburetor bowl, jets and passages without removing the carburetor from the engine.

17. It is still another object of this invention to provide the purging of the inside of the carburetor bowl, jets and passages with compressed air.

18. It is still another object of this invention to provide the purging of the inside of the carburetor bowl, jets and passages with a compressed purging agent from a spray can.

19. It is still another object of this invention to provide the purging pressurized can with a release valve, hose and tire inflator nozzle head.

20. It is further object of this invention to purge the bowl, jets and passages located on the inside of carburetor at the same time with multiple short blasts of compressed air or pressurized can solvent.

21. It is further object of this invention to leave the carburetor bowl fuel drain plug (if equipped) off during purging to get the bulk of fuel left on the bottom of the bowl out of the carburetor first.

22. It is further object of this invention to purge the remaining fuel inside the jets and small passages with the carburetor bowl fuel drain plug (if equipped) on to pressurize the internals of the carburetor with higher pressure.

23. It is further object of this invention to drain the fuel from the carburetor through the purge valve itself once the valve core is removed.

24. It is further object of this invention to purge the carburetor with valve core off.

25. It is also an object of this invention to use pressurized can filled with Halocarbon 152A (R-152a), Hydrofluorocarbon-134a (R-134a), propane, butane gas or any other gases or mixture of gases and liquids.

26. It is also an object of this invention to mix purge gas inside the pressurized can with an anti-corrosion additive.

27. It is also an object of this invention to provide a small amount of mineral oil or any other type of oil inside the pressurized gas can to leave a very small oil film inside the carburetor on all the surfaces of the jets, passages and bowl.

28. It is an object of this invention to purge the carburetor through the three-way valve with the three-way valve in position where the purge gas is directed to the carburetor only and not to the fuel tank.

29. It is an object of this invention to install two-way valve and a tee fitting into the fuel line from the fuel tank to the carburetor with a purge valve connected to one of the ports of the tee fitting.

30. It is an object of this invention to purge the carburetor through the two-way valve with the two-way valve in position where the purge gas is directed to the carburetor only and not to the fuel tank.

31. It is an object of this invention to install check valve and a tee fitting into the fuel line from the fuel tank to the carburetor with a purge valve connected to one of the ports of the tee fitting.

32. It is an object of this invention to manually activate diaphragm type carburetor primer bulb to establish initial pressurized gas flow through the carburetor.

PART NUMBER DESCRIPTION 2. carburetor body
1a. one carburetor port
1b, second carburetor port
2 throttle plate
5. emulsion tube
6. main fuel jet
7. fuel delivery port
10. carburetor bowl retaining screw
11. carburetor bowl
12. float with needle valve
15. choke plate
16. fuel shut-off valve
18. fuel filter
19. idle jet
19a. idle fuel jet
19b. idle mixing chamber
21. drain plug
40. cylindrical metal tube
41. valve core
42. valve cap
43. purge valve
44. standardized threaded section
45. customized threaded section
46. orifice
47. metal tube upper part
48. lower metal tube
49. clamp
49a quick connect fitting
50. hose
50a. hose
50b. can activation valve
51. pressurized can
52. air compressor 53. air tank
54. gauge
55. fuel feed line
56. check valve
57. three-way valve
58. two-way valve
59. hose fitting tee
60. motorcycle type purge valve assembly
61. metal tube
62. customized threaded section
63. orifice restriction passage
70. carburetor bowl cavity.
71. carburetor body openings
73. bowl vent
74. carburetor vent port
75. inner face of the carburetor body
76 needle valve sit
80. first idle system passage
81. second idle system passage
82. passage
83. idle air jet
84. idle tiny opening
85. main flow cavity
90. Venturi (90)
91. carburetor emulsion chamber
92a. passage
92b. passage
93. main fuel system air jet
93b. main system air jet passage
94. outer face of the carburetor
95. drain plug opening
100. engine
110. fuel tank
112 diaphragm type pump inlet check valve
113. outlet check valve
114. diaphragm type pump
115. loaded control valve
116. fuel metering chamber
117. cover plate
118. diaphragm
119. spring
121. transfer system jet
122. main jet
123. primer bulb chamber inlet valve
124. primer bulb chamber outlet valve
126. primer bulb (126)

BRIEF DESCRIPTION OF DRAWINGS

FIG. 5d shows and describes how to install the purge valve and how to purge the carburetor.

FIG. 6b is a 3.4 top view showing in addition to FIG. 6c, the fuel shut-off valve 16, the carburetor vent port 74 and the inner face of the carburetor body 75.

11a shows cross section of the motorcycle float type carburetors.

Figure 11A:
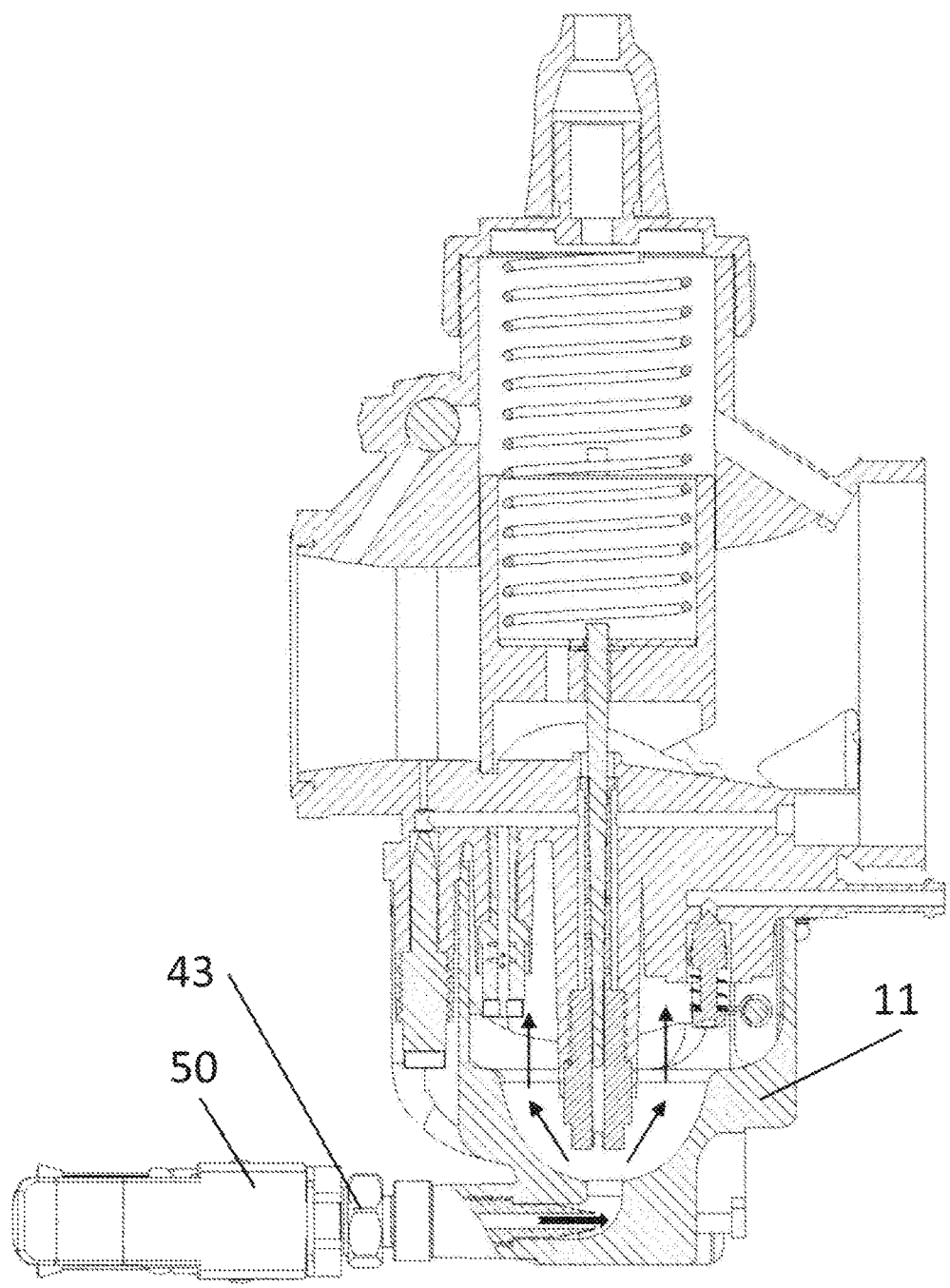
Figure 11B:
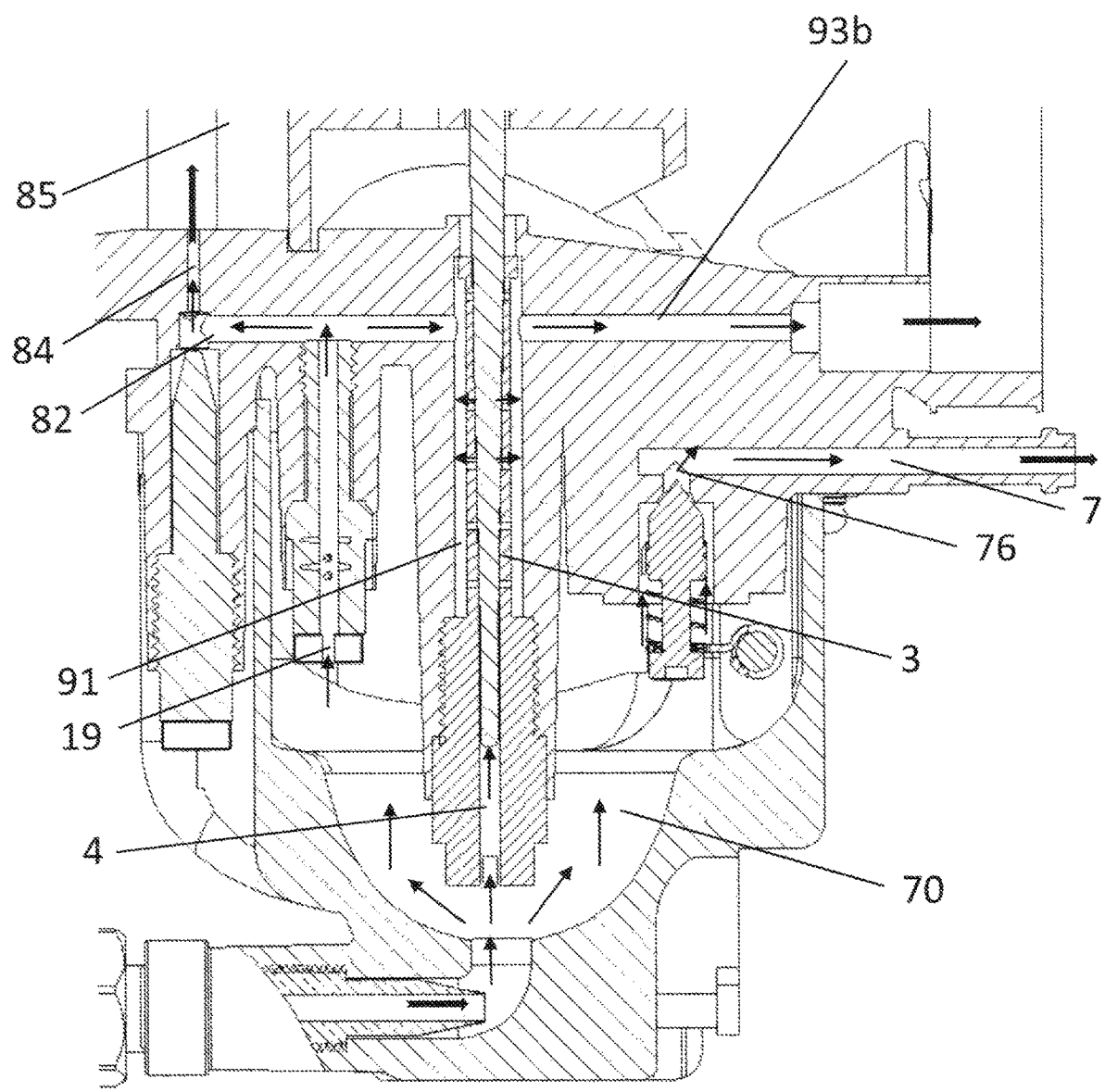

FIG. 11b is detailed cross section of the motorcycle carburetor with the emphasize to carburetor bowl, fuel jets and passages.

Figure 12A:
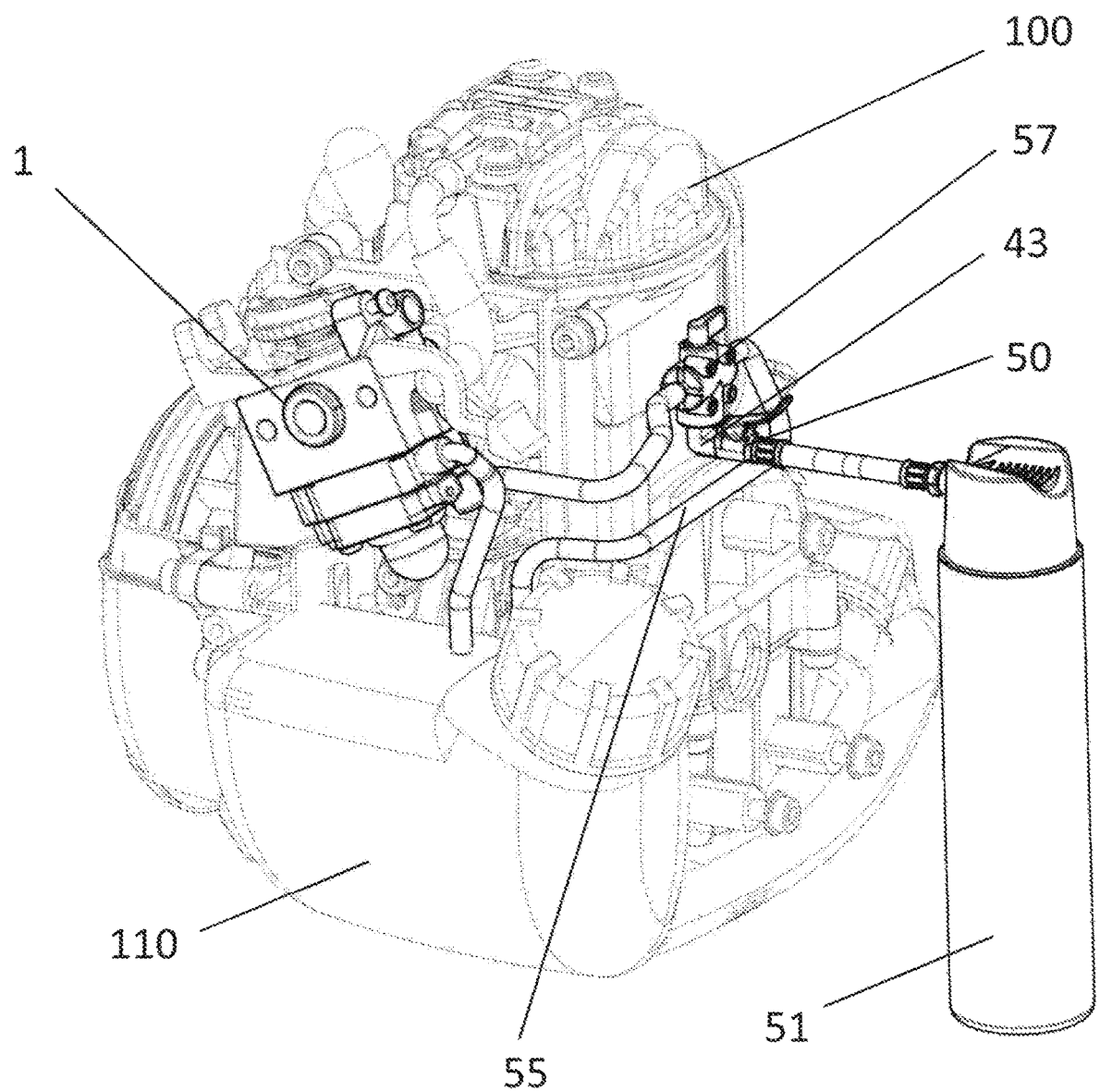

FIG. 12a is an external view of the method used to purge diaphragm carburetors used on small hand-held equipment like string trimmer, blowers, chain saws and other recreational vehicles like watercrafts.

Figure 12B:
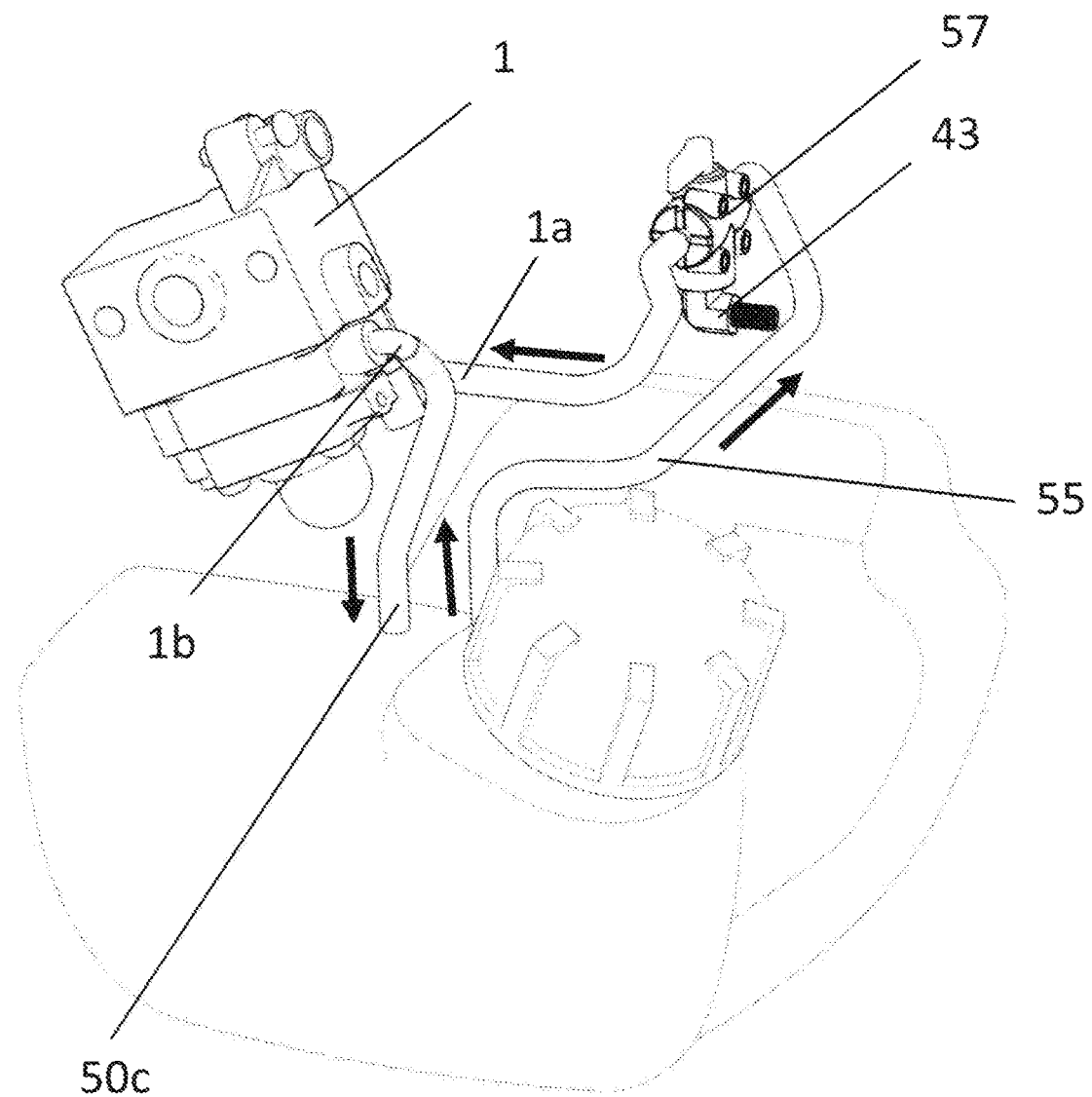

FIG. 12b shows diaphragm type carburetor fuel system with a three-way valve and purge valve installed on fuel feed line.

Figure 12C:
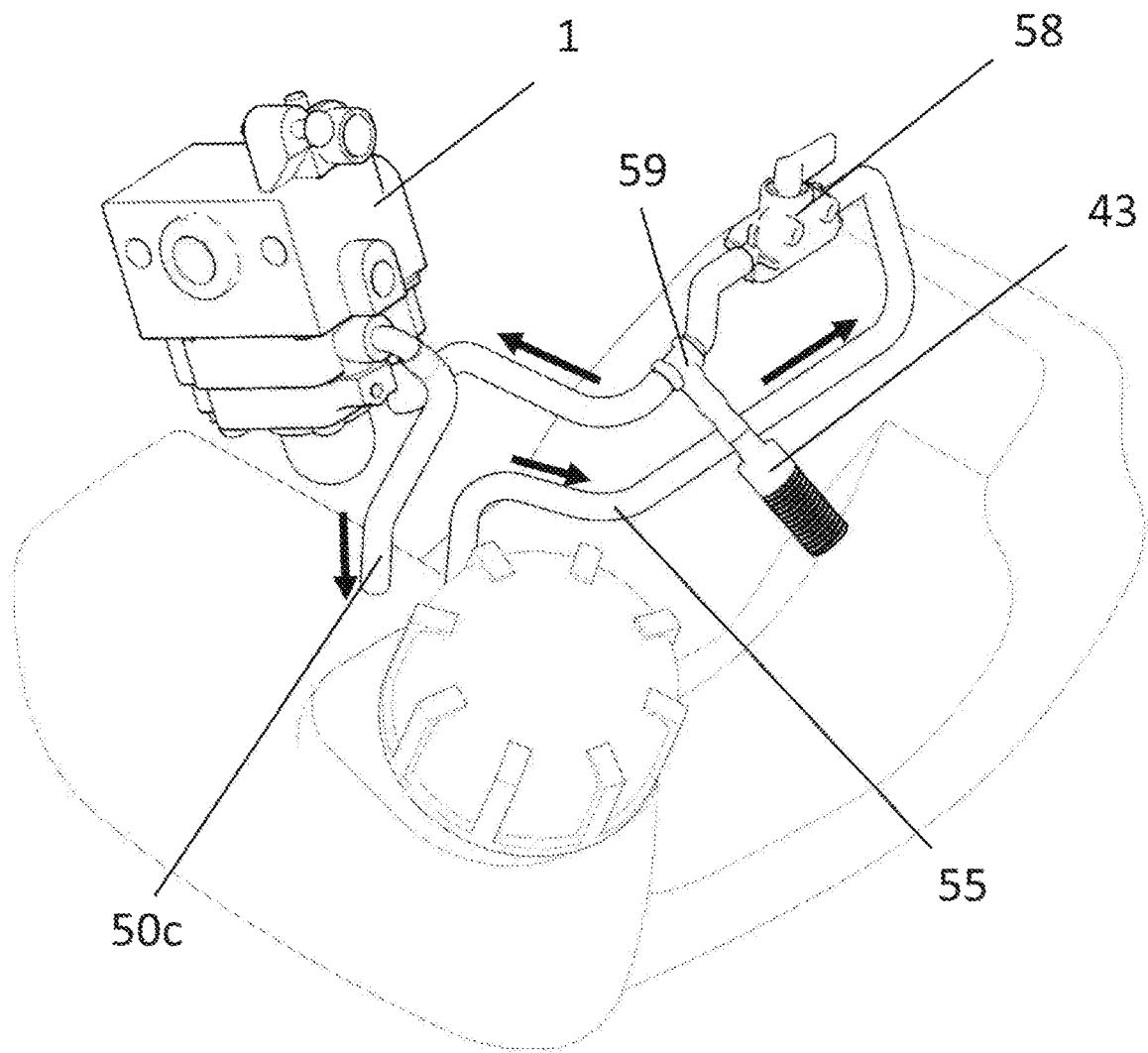

FIG. 12c shows diaphragm type carburetor fuel system with a two-way valve and purge valve installed on fuel feed line.

Figure 12D:
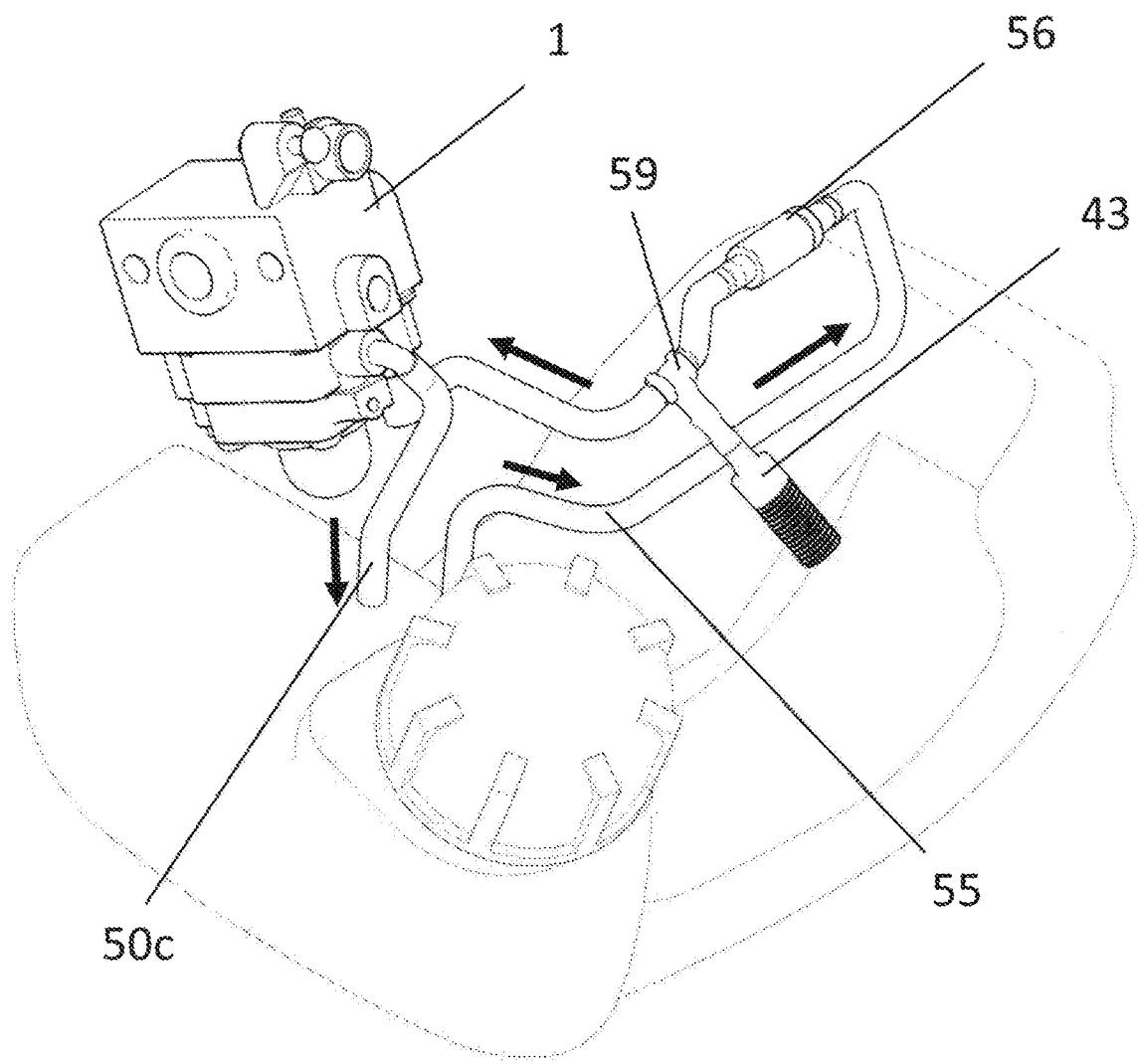

FIG. 12d shows diaphragm type carburetor fuel system with a check valve and purge valve installed on fuel feed line.

Figure 12E:
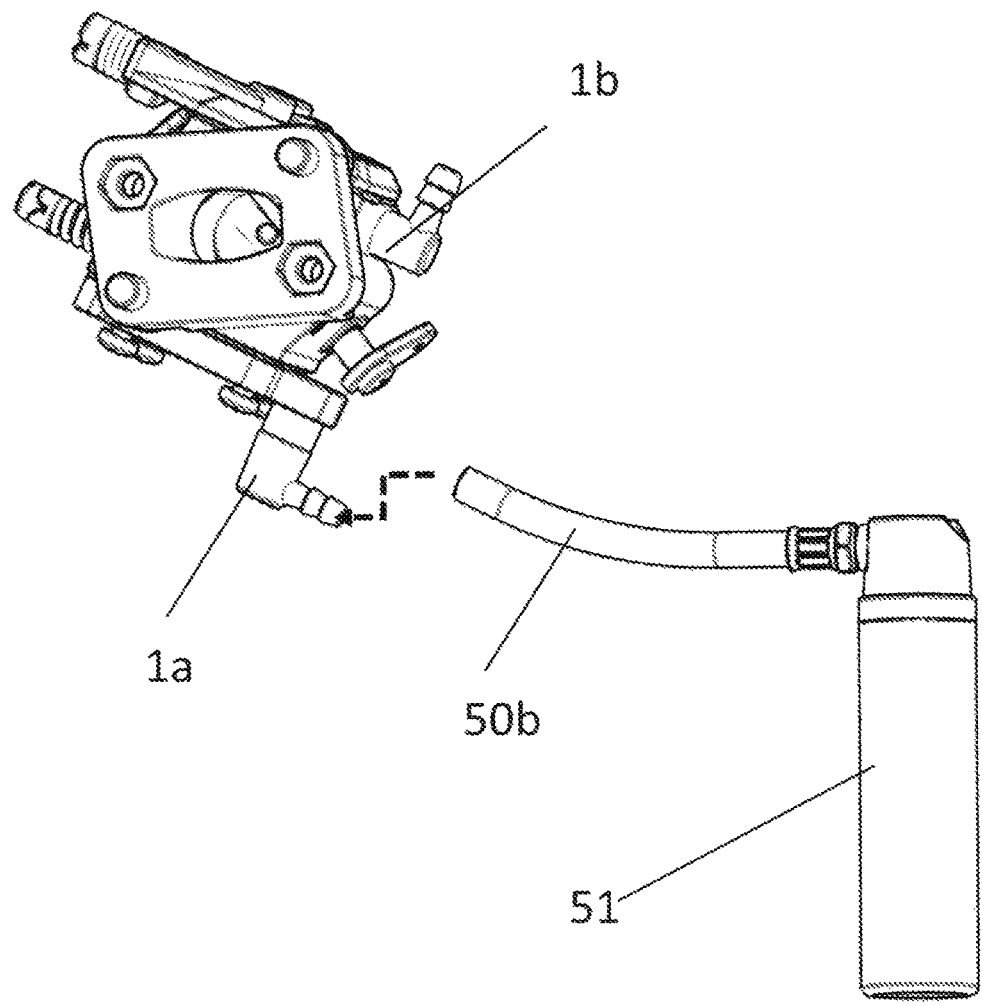

FIG. 12e shows diaphragm type carburetor fuel system where pressurized can gets installed directly to the carburetor fuel feed port (without additional valves in line).

Figure 12F:
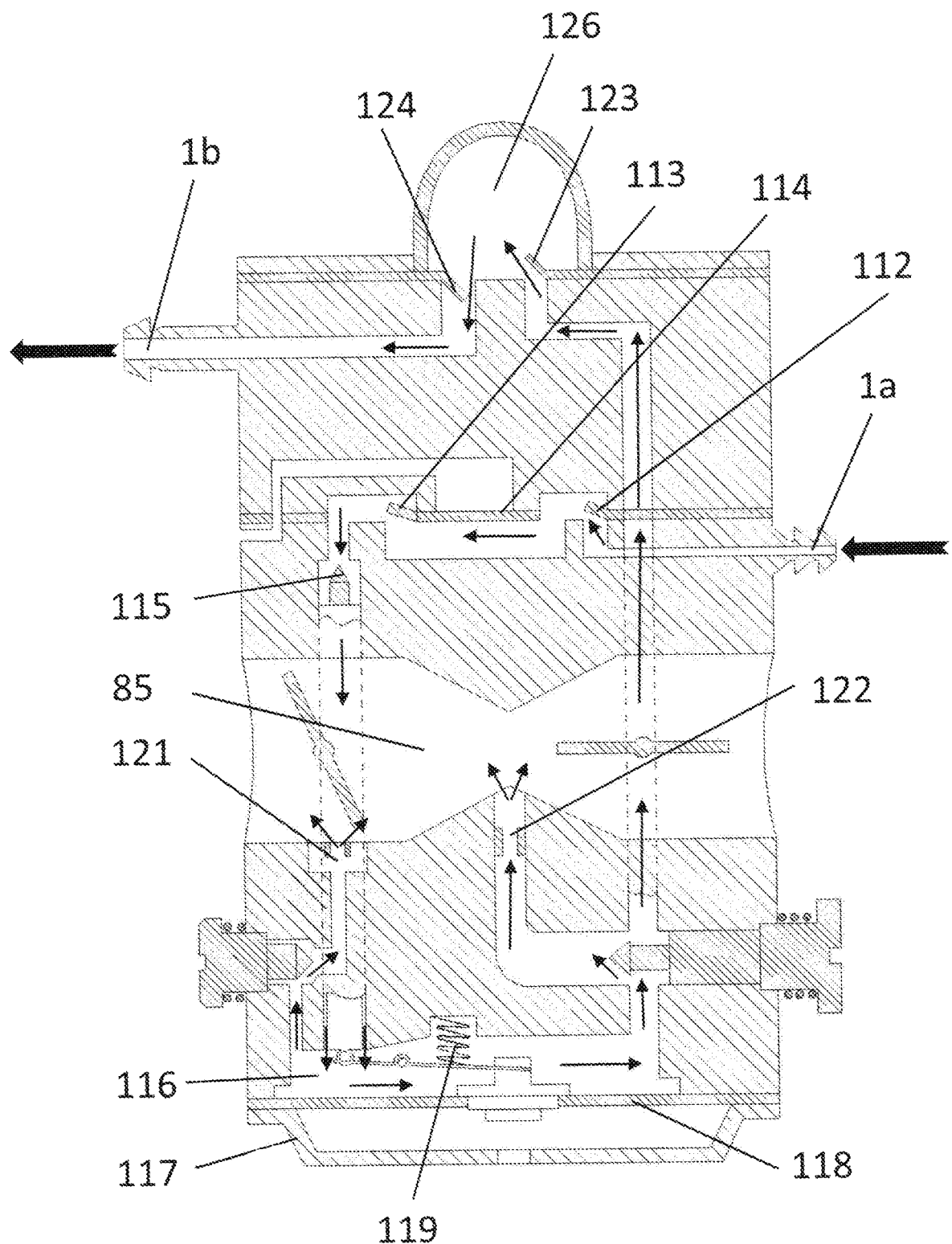

FIG. 12f is cross section for diaphragm type carburetor with the purge circuit through the carburetor.

Figure 12G:
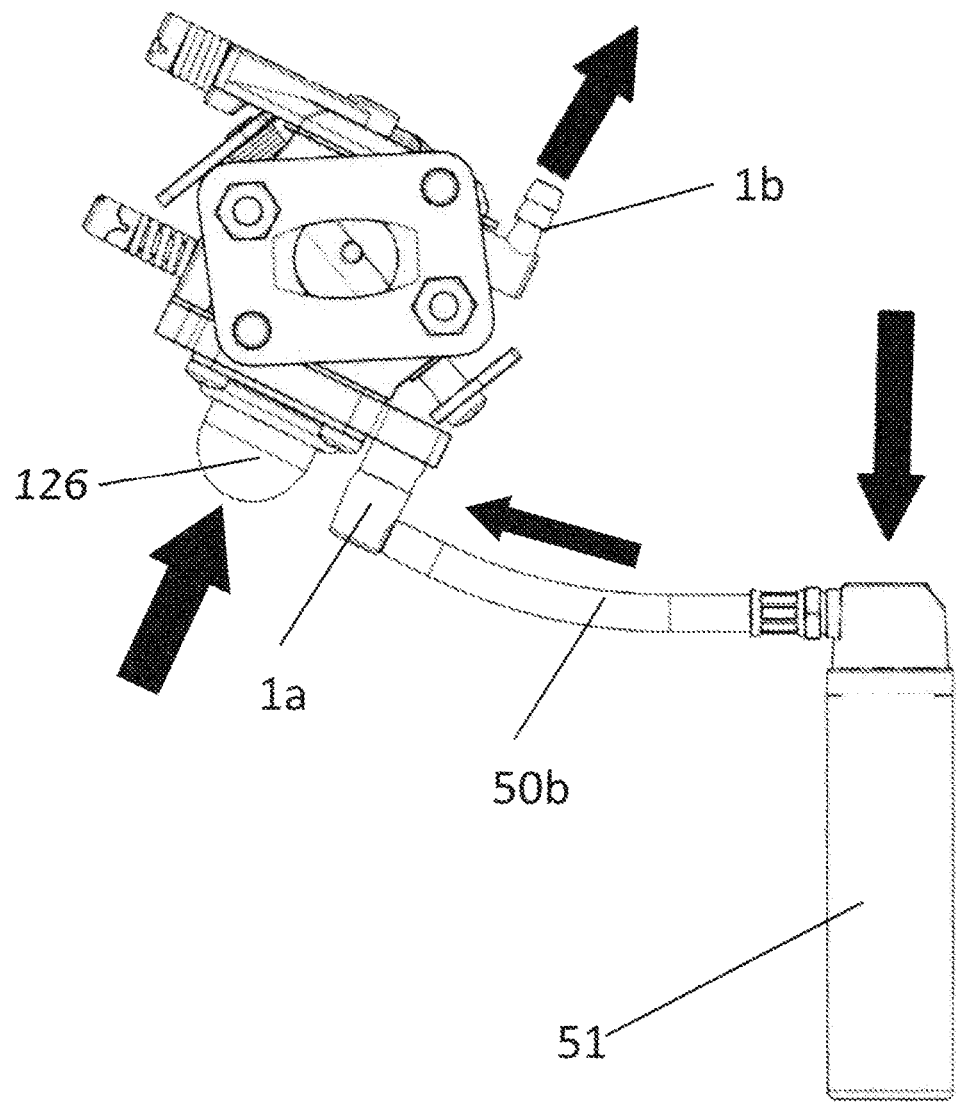

FIG. 12g is a view of the method used to purge diaphragm carburetors where carburetor's primer bulb is activated the same time as the gas from the pressurized can.

DESCRIPTION OF THE PREFERRED EMBODIMENT

Figure 1:
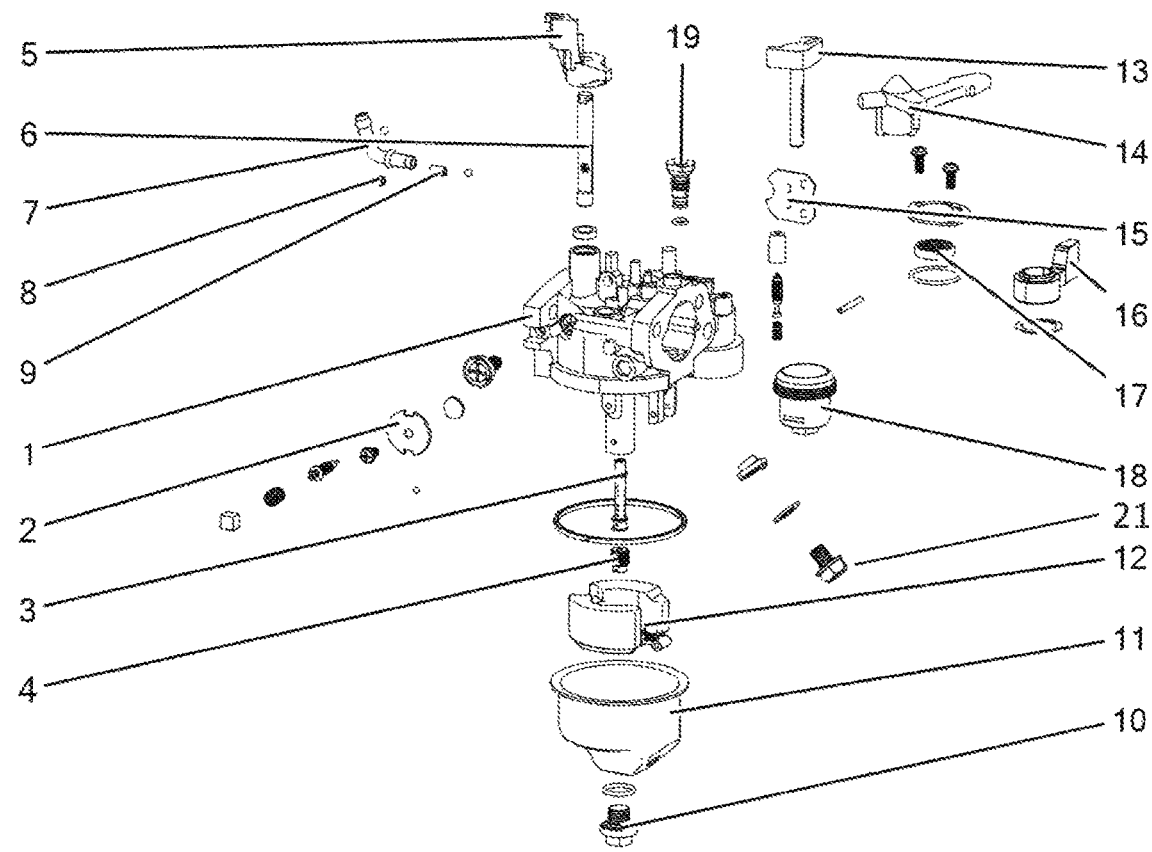
FIG. 1 is exploded view of a typical float type small engine carburetor used in power equipment like lawn mowers, snow blowers, pressure washers, generators, etc. The main parts of the carburetor are carburetor body 1 and carburetor bowl 11.

A small engine float type carburetor exploded view is shown in FIG. 1 having a carburetor body 1, throttle plate 2, choke plate 15, fuel delivery 7, Fuel filter 18, fuel shut-off valve 16, bowl 11, bowl retaining screw 10, float with needle valve 12.

During engine operation the fuel from inside the bowl gets sucked through the main fuel jet 4, emulsion tube 3 and idle jet 19. All the fuel jets and the internal passages of the carburetor get wet with the fuel. Once the engine stops, some of the fuel from the jets and internal passages drains back to the bowl while some of it remains inside the jets and passages in a form of a tiny fuel film. The fuel remains inside the small openings of the jets and passages because of the fluid capillary effect. Over long sitting the ethanol from the fuel attracts water and corrosion builds up inside the small jets and passages. Over even longer period of sitting, the fuel from the bowl evaporates leaving corrosion and debris on the bottom of the bowl causing substantial problems when the engine is next time started. To prevent the formation of deposits inside the bowl, jets and passages the inside purging of the carburetor is suggested.

Figure 2A:
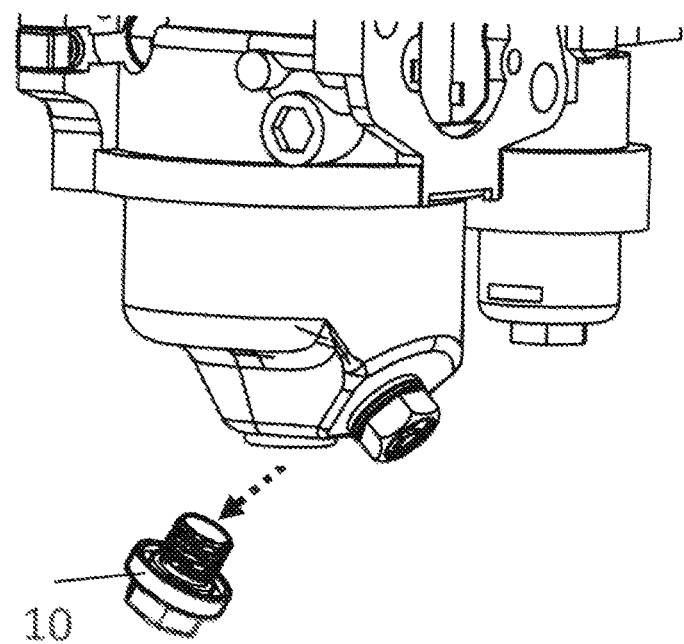
FIG. 2a shows the carburetor bowl retaining screw 10 is removed prior to purging.
Figure 2B:
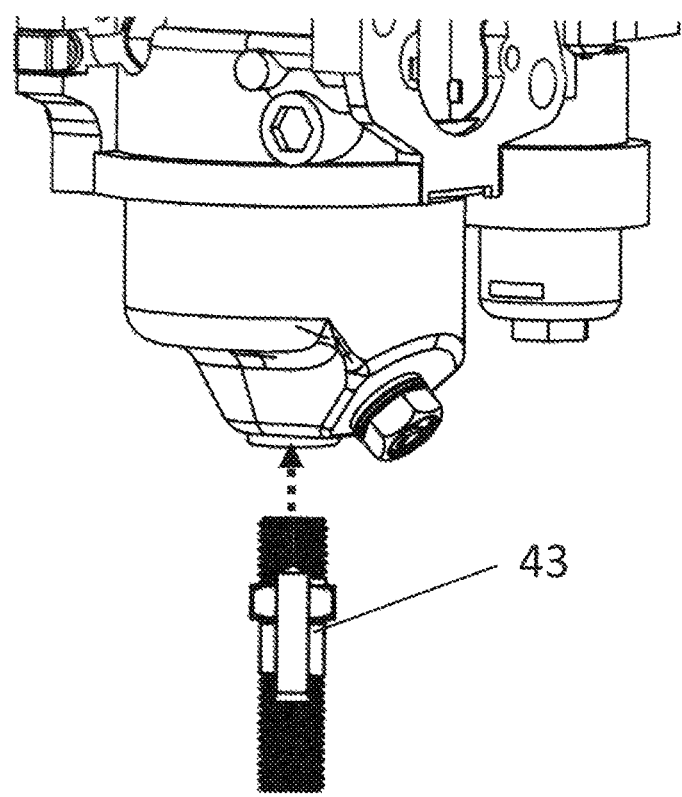
FIG. 2b shows the purge valve 43 placement into where the location of carburetor bowl retaining valve.

The present invention has overcome these problems by purging the carburetor bowl, all the jets and all the passages with a compressed air and/or pressurized cleaning solvent. The installation of the purge valve on a preassembled carburetor is simple. The carburetor's bowl retaining screw is removed for the purge valve assembly, FIG. 2a. The carburetor can be delivered with the pneumatic one-way purge valve installed as well.

Figure 3A:
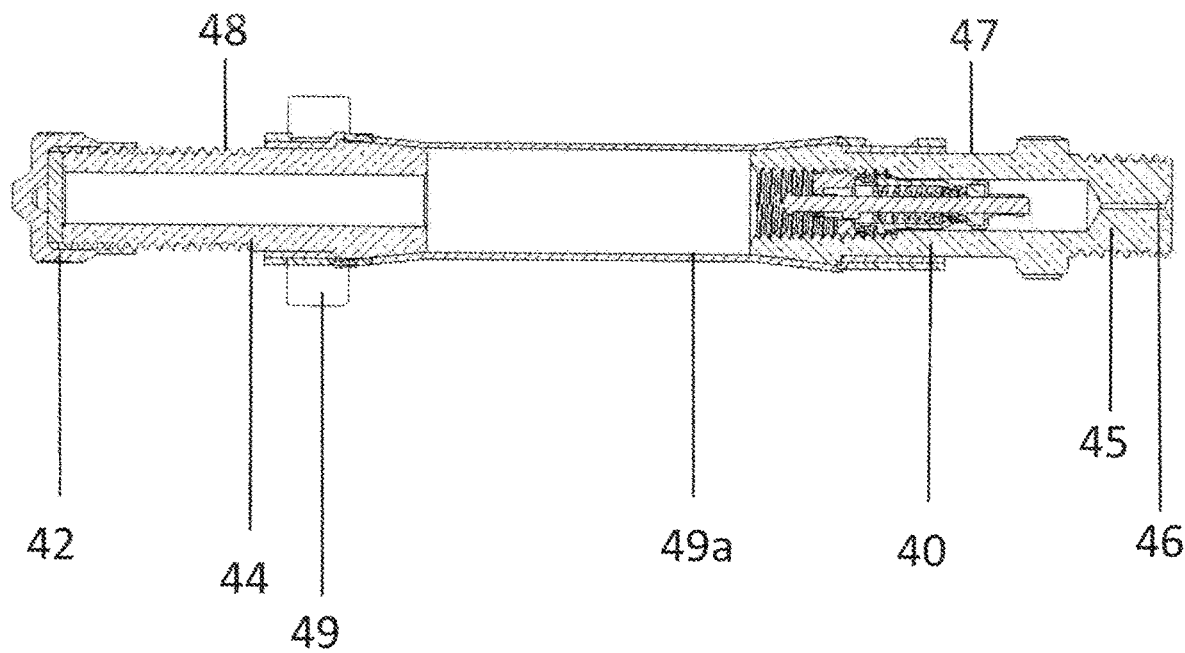
FIG. 3a shows cross section of the divided (extended with a hose) one-way pneumatic purge valve (Schrader type) for the power equipment machinery carburetors.
Figure 3B:
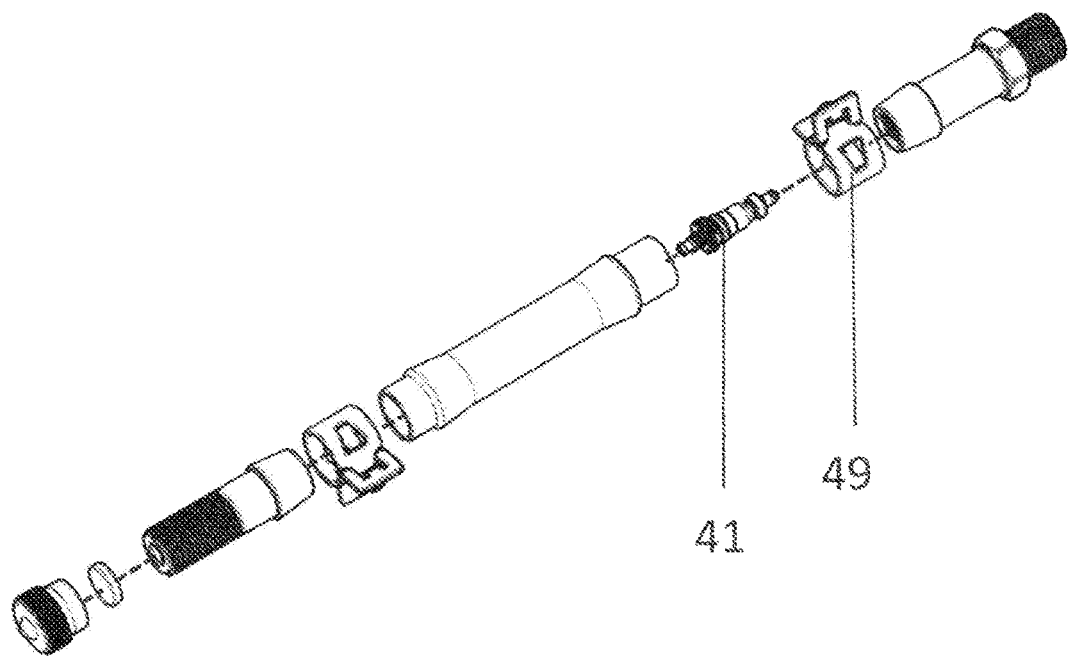
FIG. 3b shows a better view how the clamp 49, holds the valve core 41 in the assembly.
Figure 3C:
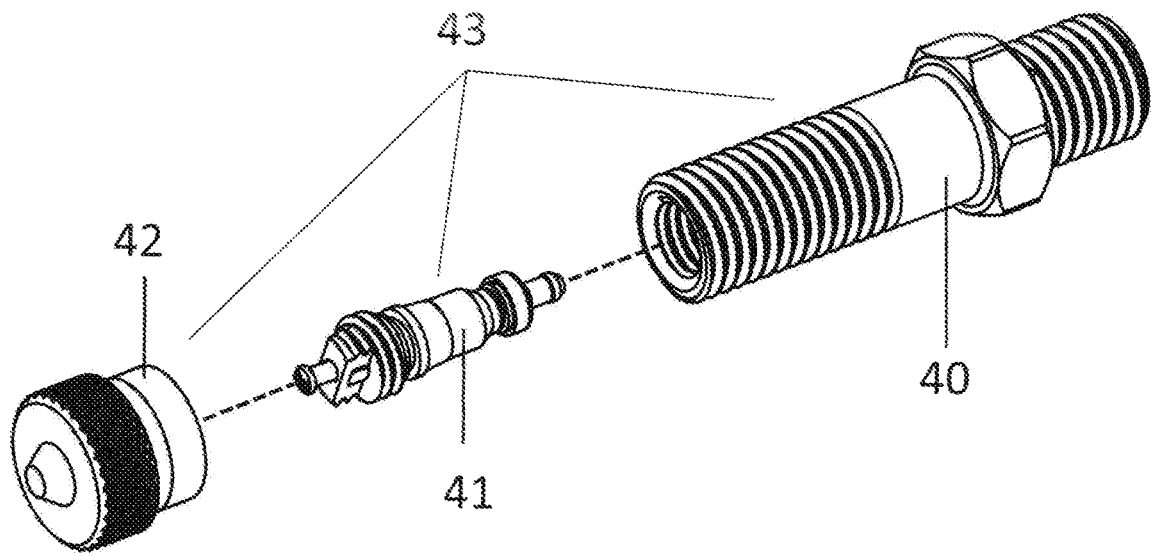
FIG. 3c shows how the sub-components of the purge valve 43 fit together, the sub-components being the cylindrical metal tube 40, the valve core 41 and the valve cap 43.

Exploded view and cross section of the pneumatic one-way (Schrader) valve and cross section of the adapter assembly is shown in FIG. 3a. The assembly 43 consists of an externally threaded hollow cylindrical metal tube 40, typically of brass. The metal tube or adapter 40 is formed with a standardized threaded section 44 on one side so caps and tools generally are universal for the valves on all common applications. The customized threaded section 45 of the metal tube on the other side is made to fit within an outlet of the small engine carburetor bowl retaining assembly or drain plug in substantially permanent manner.

Over-pressurization of the inside of the carburetor and in specific the primer bulb if equipped (not shown) connected to the carburetor is prevented by limited purge air flow. For this purpose, inside the metal tube 40 and on the customized threaded section 45 an orifice 46 is provided. In respect to the gas flow sense through the purge valve assembly 43, the orifice 46 is located after the valve core 41.

In the center of the exterior metal tube end is the valve core 41. The core of the valve can be removed or tightened with a tool. The fuel from the carburetor and fuel tank can be drained through the purge valve once the valve core is removed.

A valve cap 42 is used on a pneumatic one-way (Schrader) valve because if one is not fitted, dirt and water can enter the outside of the valve, potentially jamming it or contaminating the sealing surfaces and causing a leak.

The cross section of the divided purge valve assembly is shown in FIG. 3a. This type of arrangement is necessary if the carburetor as installed on a machine is out of reach. In this case, the metal tube upper part 47 carries the valve core 41. On one side it ends with the customized threaded section 45 and orifice 46 while on the other side it ends with a barb fitting 49. The lower metal tube 48 one side ends with the standardized threaded section 44, cap 42 while the other side ends with a quick connect fitting 49a. The two barb fittings are connected with a hose 50 and both ends of the hose are secured to the barb fittings with a clamp 51.

Figure 4A:
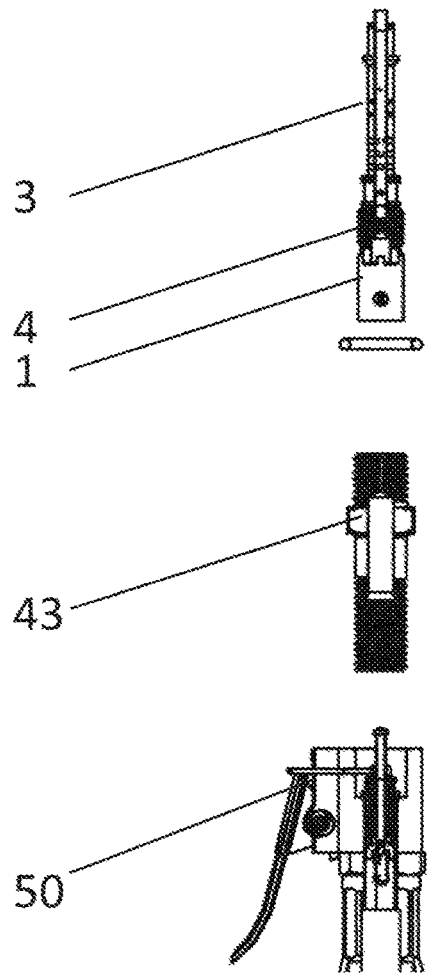
FIG. 4a shows carburetor main jet and emulsion tube cross section with the purge valve and air nozzle before the assembly.
Figure 4B:
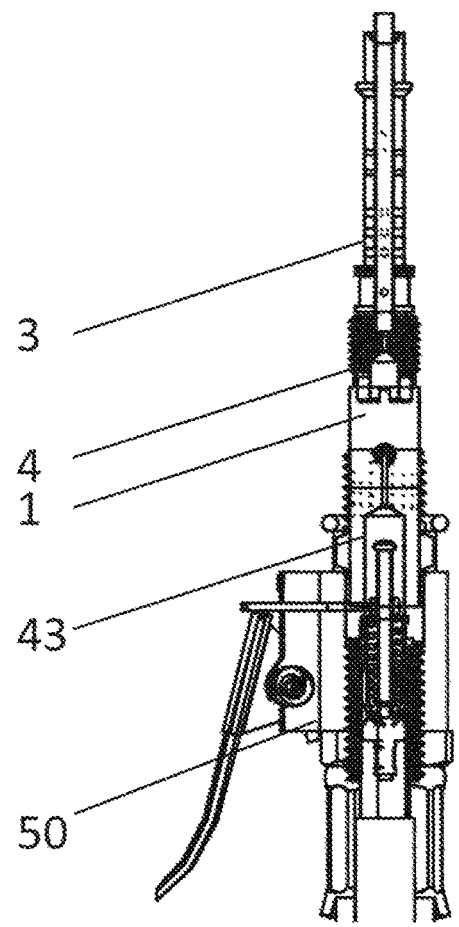
FIG. 4b shows carburetor main jet, emulsion tube, purge valve and air nozzle cross section after the assembly.
Figure 4C:
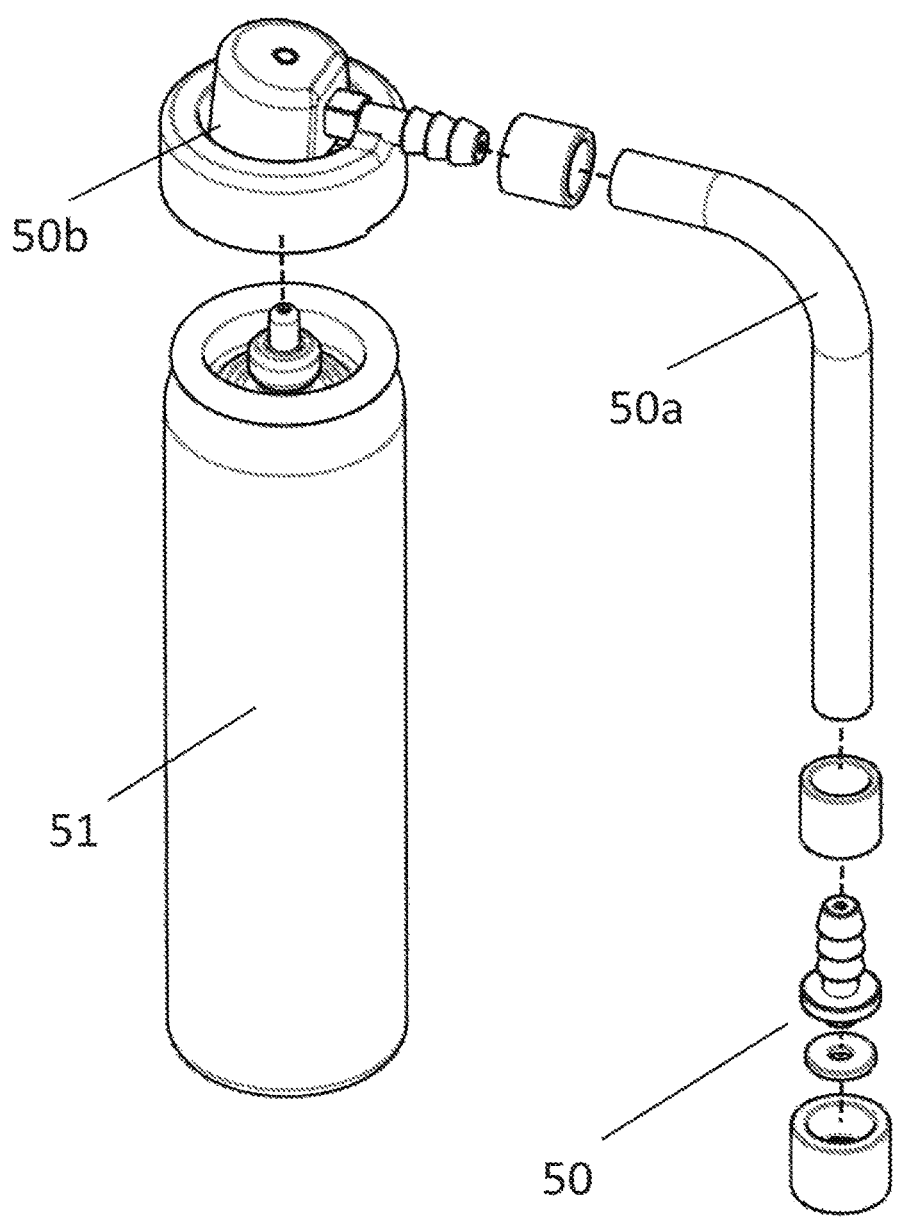
FIG. 4c shows exploded view of the pressurized can parts

FIG. 4a shows the carburetor cross section with high-lighted main fuel jet 4 and emulsion tube 3. The purge valve 43 mounts permanently inside threaded portion of the carburetor body 1 and under the main fuel jet 4 and emulsion tube 3. The air hose nozzle quick connect fitting 50 connects to the standardized threaded portion of the purge valve 43. This nozzle is just one of many types of commercially available nozzles from different manufacturers but is not part of this invention. FIG. 4b shows the same cross section but with all the components assembled. FIG. 4c shows the exploded view of the can 51 assembly: can activation valve 50b, hose 50a and connector nozzle 50.

Figure 5A:
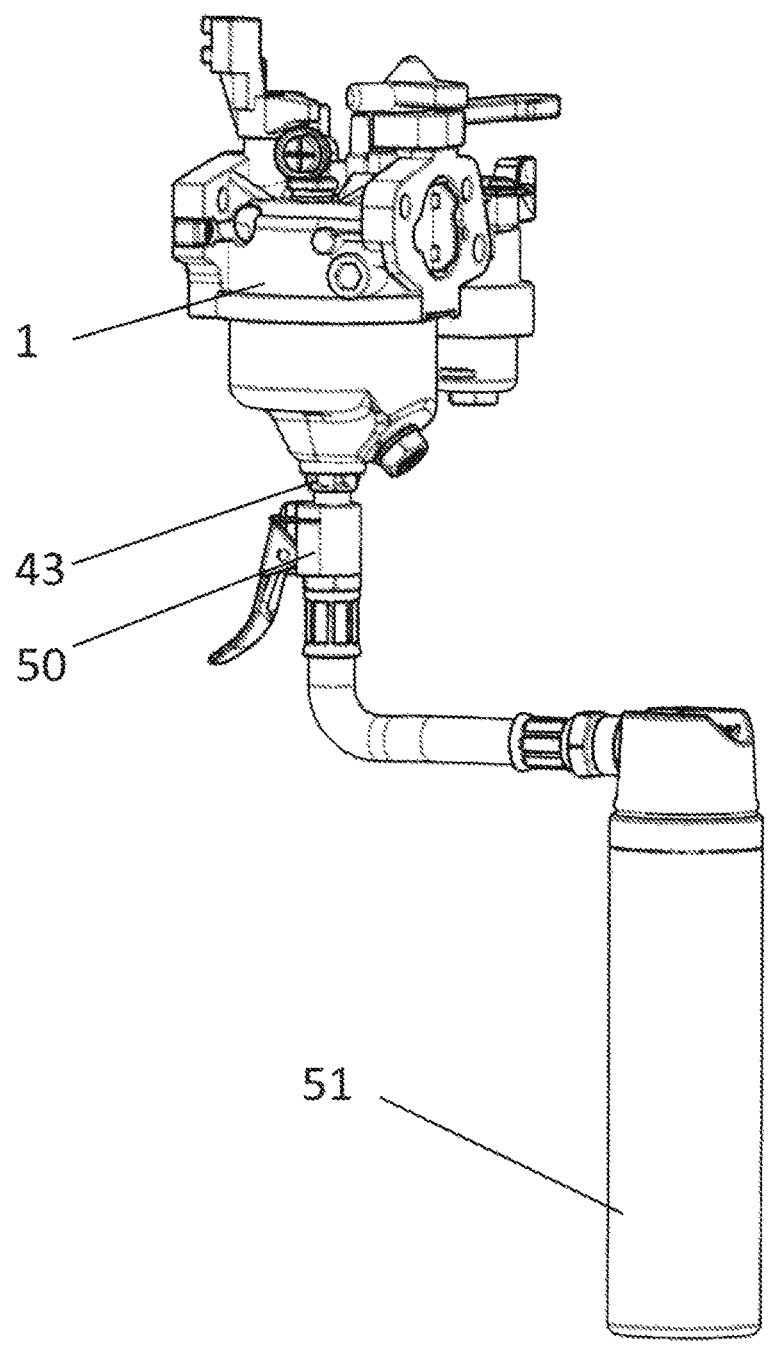
FIG. 5a shows pressurized can connected to the carburetor through an air nozzle and a purge valve
Figure 5B:
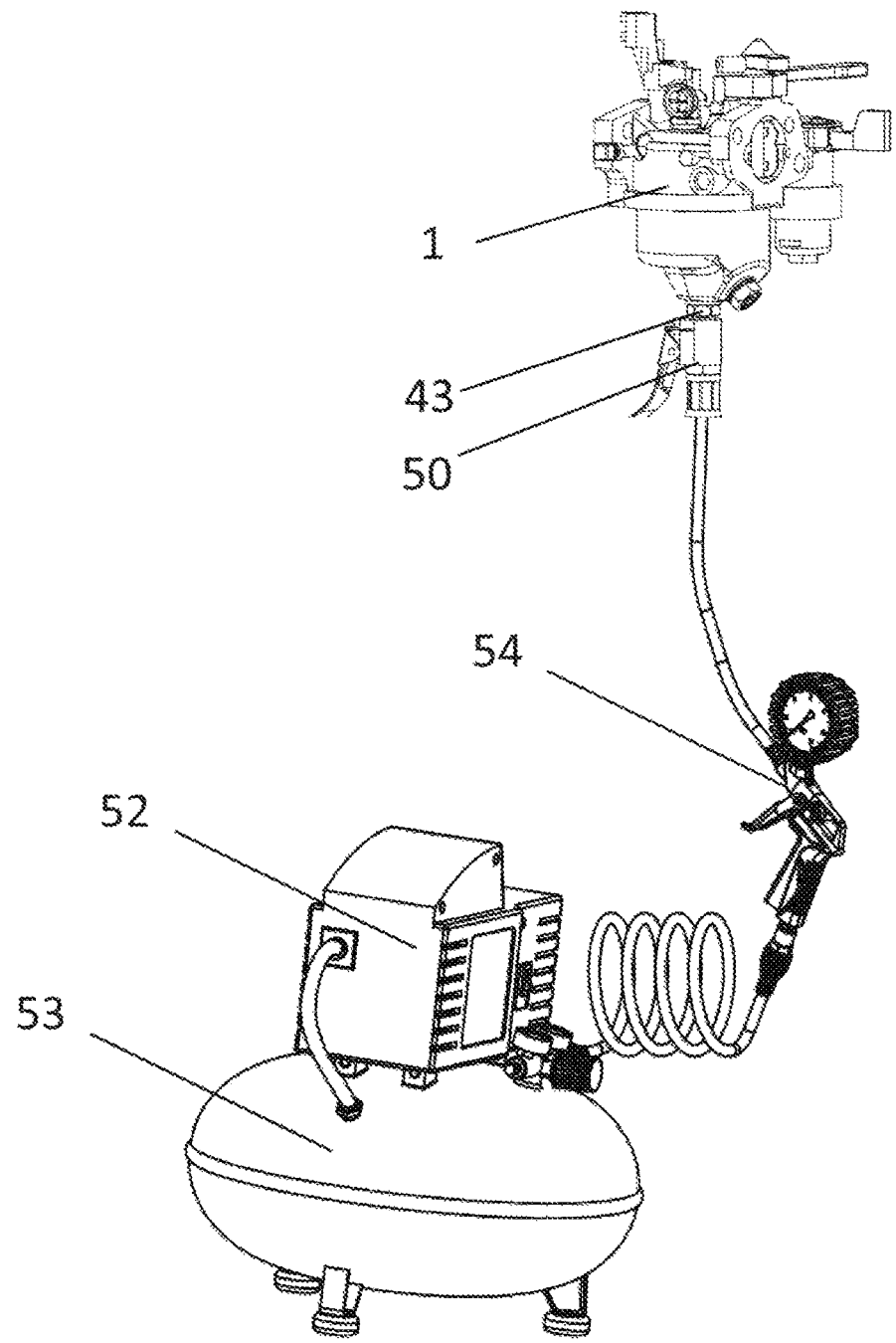
FIG. 5b shows carburetor connection to an air compressor.

Pressurized with air and/or cleaning solvent can 51 connected through the quick connect nozzle 50 and purge valve 43 to the carburetor is shown in FIG. 5a. The pressurized can be replaced with a commercially available air compressor 52 with air tank 53 and air nozzle with or without a gauge 54 but with the quick connect or screw-on end 50.

Figure 5C:
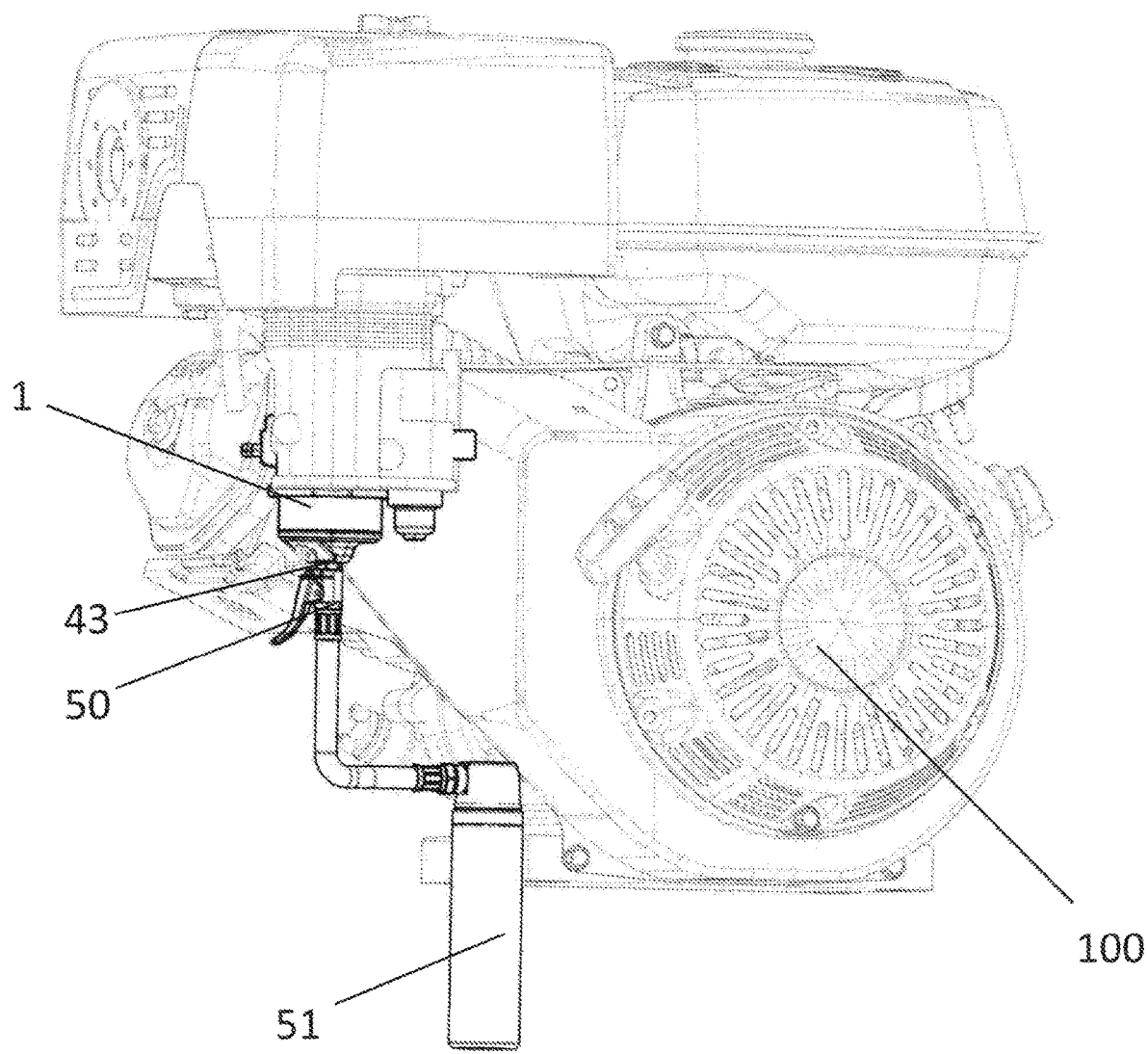
FIG. 5c shows pressurized can connected to the carburetor mounted on an engine.

It is important to mention that the entire purge cycle is done on the carburetor 1 installed on the engine 100, FIG. 5c. There is no need to remove the carburetor from the engine. FIG. 5d shows and describes how to install the purge valve and method how to purge the carburetor.

Internal Carburetor Purge in General

In order for a combustion engine to run properly at different speeds and loads, the carburetor design provides four specific operating systems:
   e. Fuel delivery to bowl
   f. Idle system
   g. Transition system
   h. Main system Since the fuel gets in contact with all the four systems components, all the surfaces of the jets and passages of the four systems inside the carburetor have to be purged.

Power Equipment Machinery Float Type Carburetor Purge

Figure 6A:
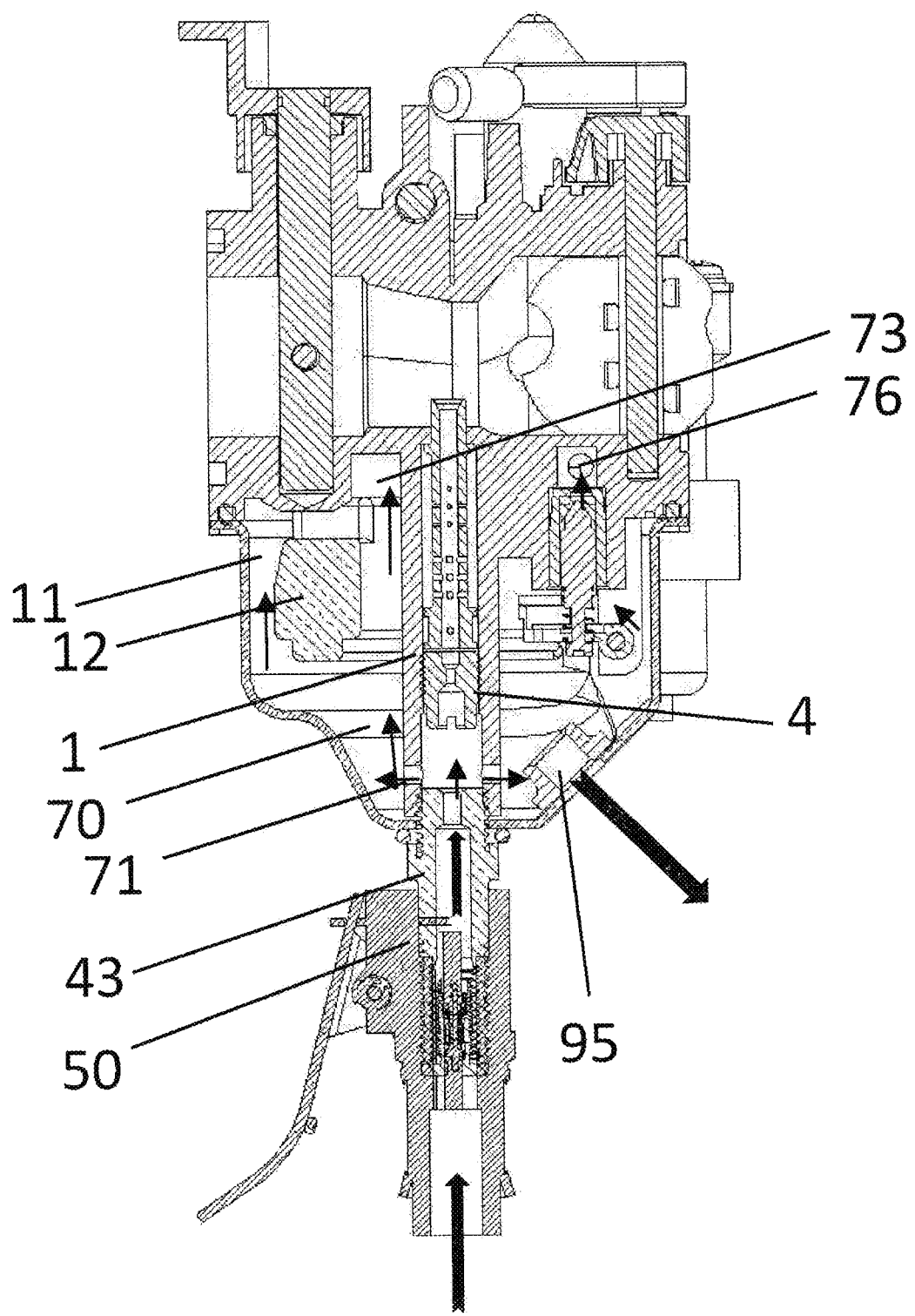
FIG. 6a is a cross section of the carburetor with the installed purge valve and attached air into the carburetor bowl cavity showing the carburetor drain plug opening 95.

With the fuel drained out of the carburetor through the drain plug 21 and the nozzle 50 attached to the purge valve 43 the carburetor is ready to be purged, FIG. 6a. The bottom view and the orthogonal view of the carburetor bottom without bowl cover 11 and float 12 installed are also shown on the right side of the FIG. 6a.

Bowl Purge

Figure 6B:
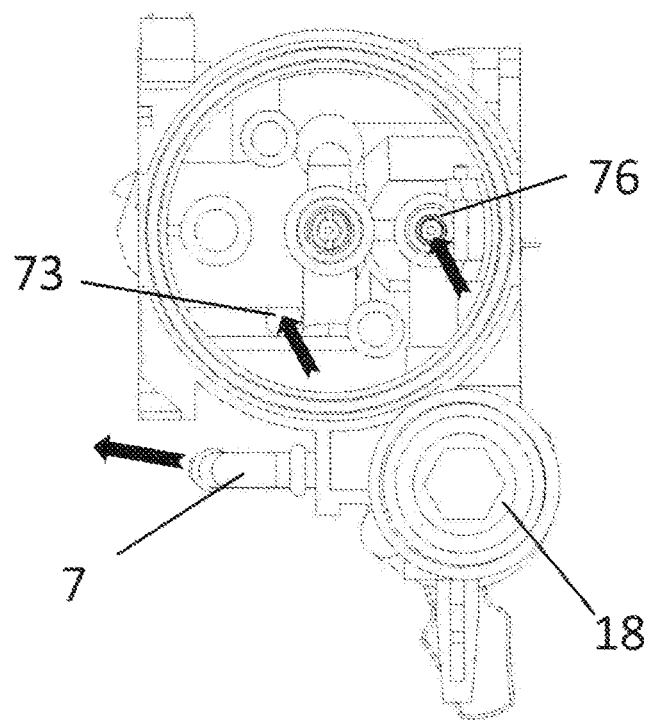
FIG. 6b is a top view of the carburetor showing the fuel delivery port 7, the fuel filter 18, the bowl vent 73, and the needle valve sit 76.
Figure 6C:
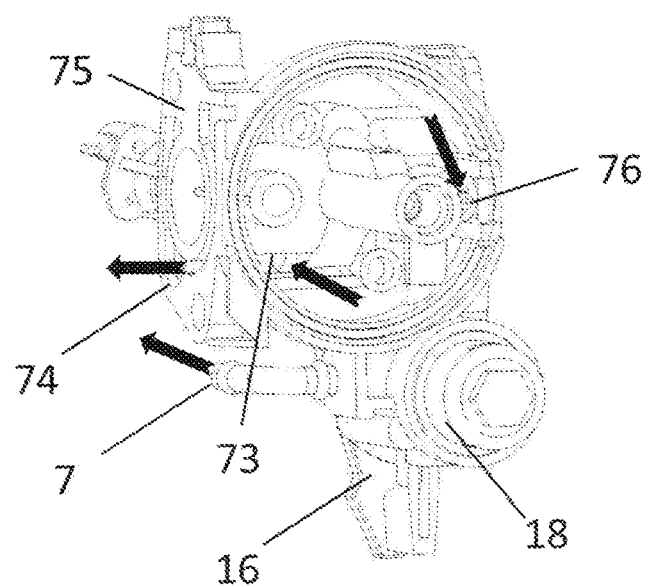

Compressed air enters the carburetor bowl cavity 70 through the purge valve and the two small openings 71 located beneath the main fuel jet, FIG. 6a. The pressurized mixture of purge air and remaining amount of fuel inside the bowl cavity 70 escapes to the outside of the bowl through the bowl vent 73 located in the top of the carburetor bowl cavity and vent port 74 located on the inner face of the carburetor body 75 out of the carburetor and into the atmosphere, FIGS. 6b and 6c. In case the fuel valve 16 is left open the air from inside the bowl escapes through the needle valve sit 76, fuel filter 18 and fuel delivery port 7 into the fuel tank (not shown). For this purpose, entire amount of fuel has to be drained from the fuel tank before the purging. In order to easier purge the remaining fuel from the bottom of the bowl, the drain plug 21 can be removed and the mixture of remaining fuel and purge air or gas can escape through the drain plug opening 95, FIG. 6a.

Idle System and Transition System Purge

Figure 7A:
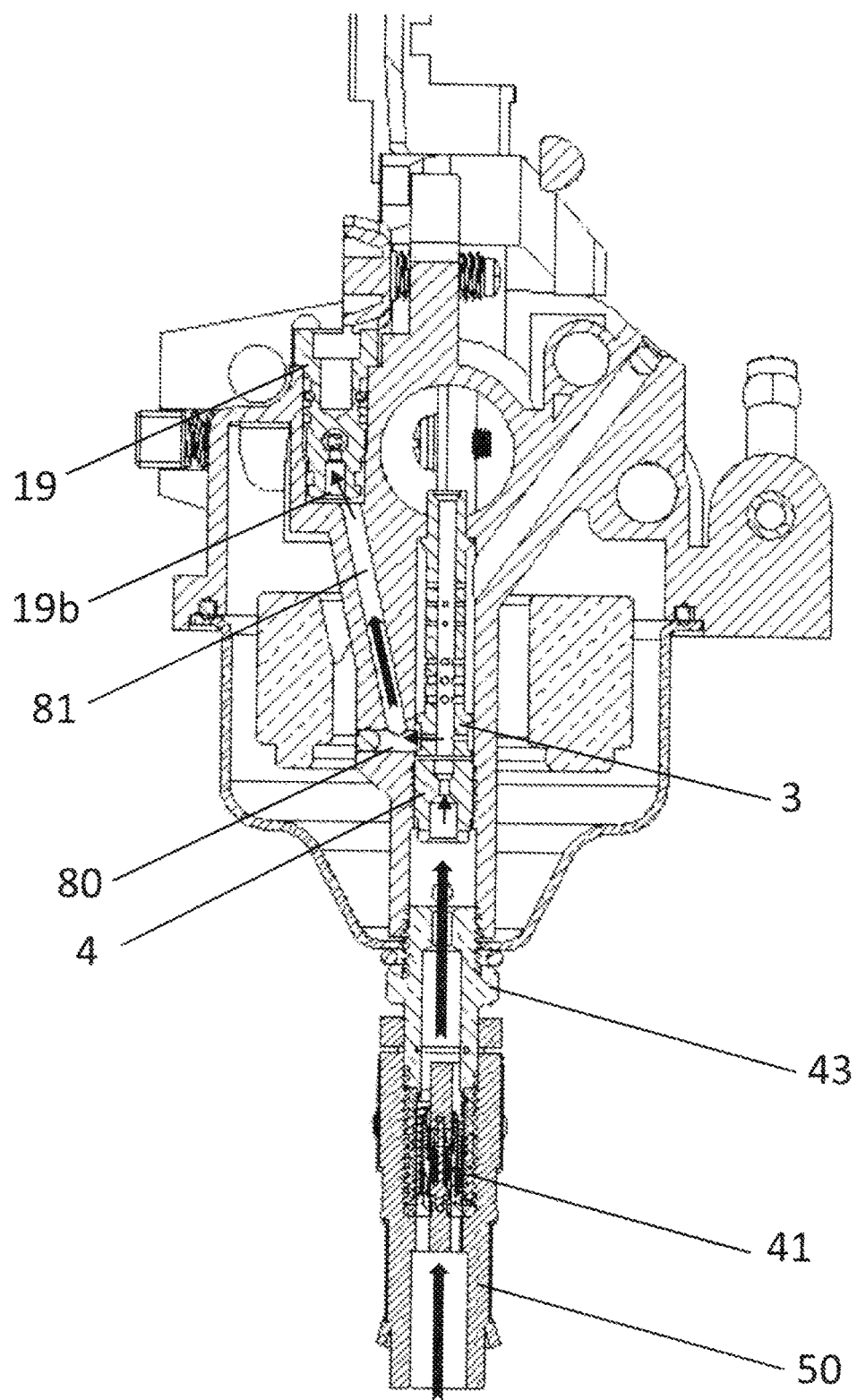
FIG. 7a and FIG. 7b is a cross section of the carburetor installed purge valve and attached air nozzle in relation to carburetor idle system jets and passages circuit.

As the purge air enters through the purge valve 43, it pressurizes the bowl and all the internal passages of the carburetor. As shown in FIG. 7a the idle system passages 80 and 81 get purged with the air passing through the main jet 4 and by the emulsion tube 3 on its way to the idle mixing chamber 19b located inside the plastic plug 19. Before the air reaches into the mixing chamber it passes through the idle fuel jet 19a located on the bottom of the plastic plug 19.

Figure 7B:
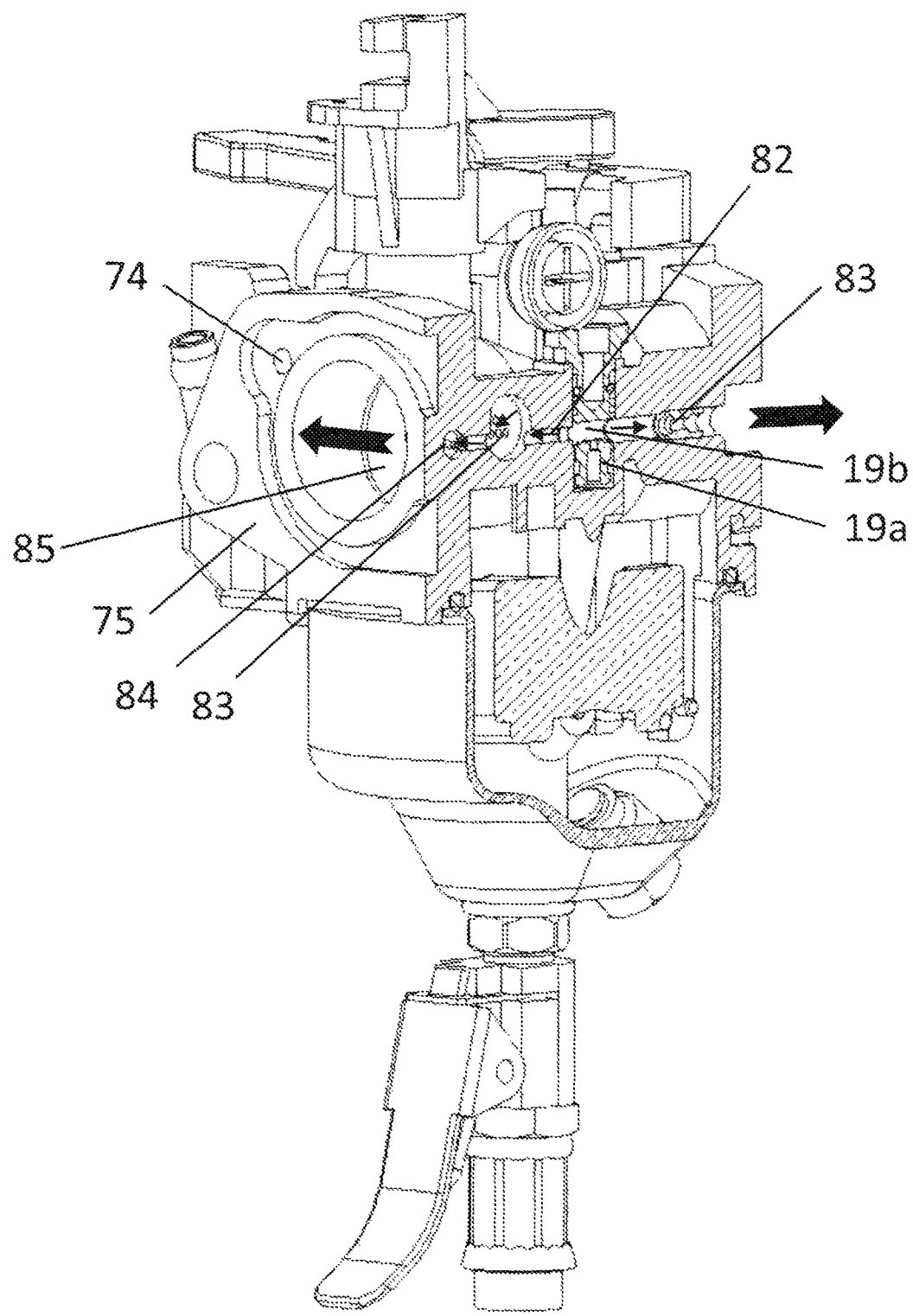

FIG. 7b shows cross section of the carburetor through the final part of the idle and transition systems. On its way out of the mixing chamber 19b, the air scrubs off the remaining fuel and ethanol film from the passage 82 to the idle tiny opening 84 and transition system openings 83 all the way to the carburetor main flow cavity 85 located on the inner part of the carburetor 75. On the opposite side, the air passes through the idle air jet 83 and into the atmosphere or if equipped air filter box (not shown).

Main Fuel System Purge

Figure 8A:
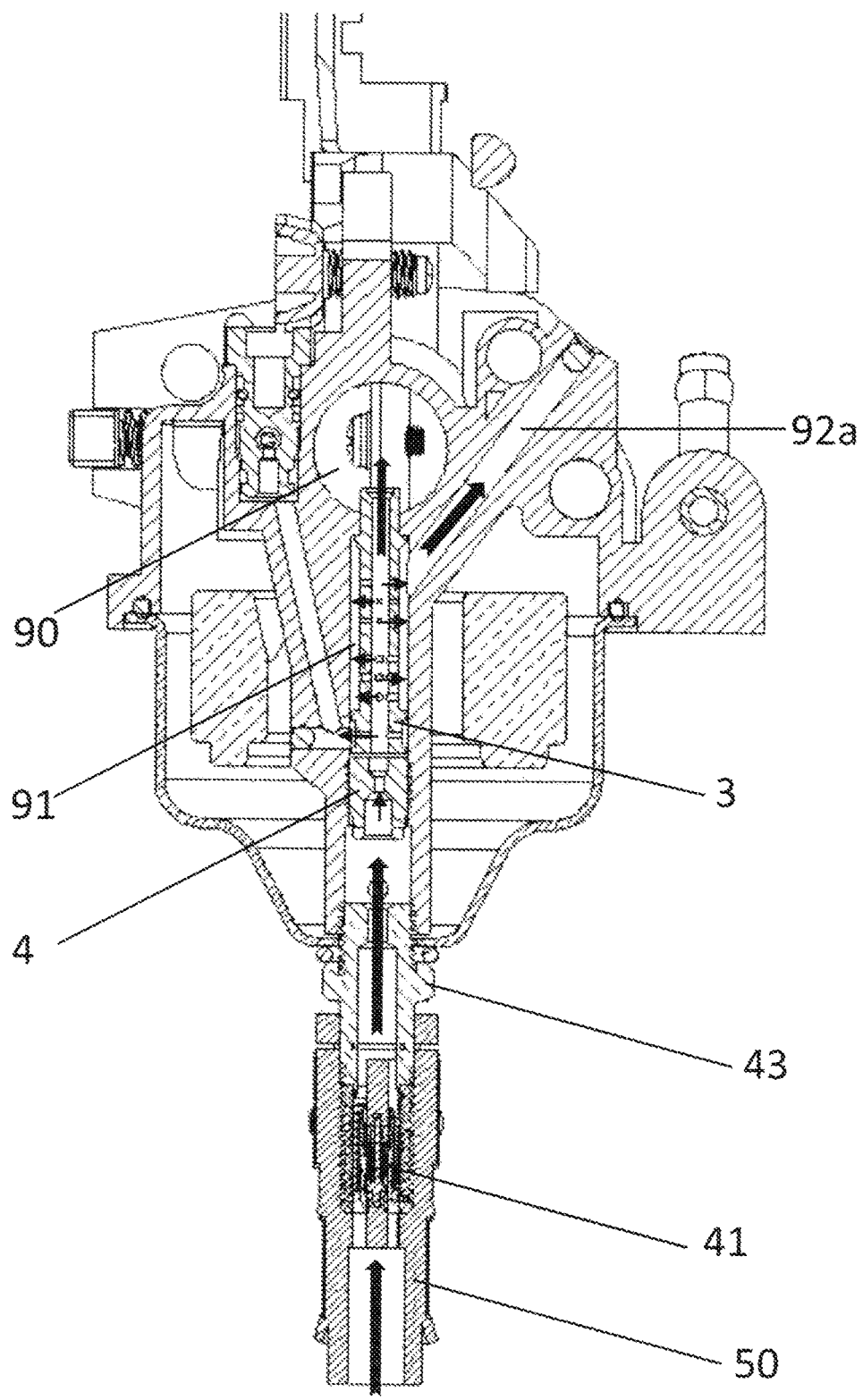
FIG. 8a and FIG. 8b is a cross section of the carburetor installed purge valve and attached air nozzle in relation to carburetor main system jets and passages circuit.
Figure 8B:
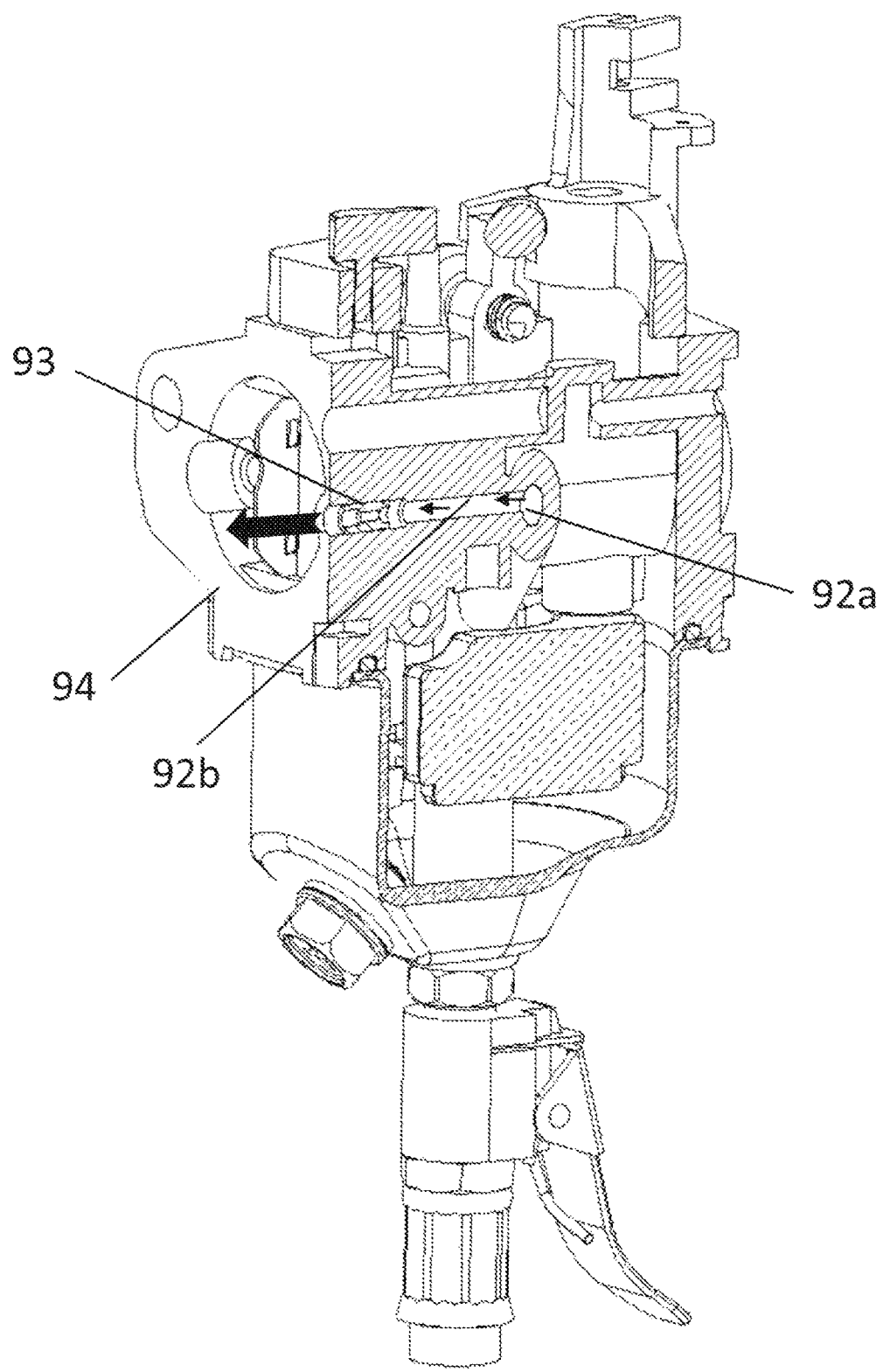

FIG. 8a and FIG. 8b show the main fuel system purge. On its way upwards and out of the carburetor the pressurized air passes through the main jet 4 and emulsion tube 3 and into the carburetor main flow opening called Venturi 90. The air flow removes the remaining gasoline and ethanol film from the inside of the main fuel jet 4 first. Then, the air flow removes all the remains of gasoline and ethanol film from the inside and outside of the emulsion tube 3. Partial amount of this air flow purges the small orifices drilled across the emulsion tube 3. Since the cavity (air gap) between the outside of the emulsion tube 3 and the inside of the carburetor emulsion chamber 91 are connected through passage 92a. FIG. 8a and passage 92b FIG. 8b to the main fuel system air jet 93 seen in FIG. 8b, this amount of air escapes through the main system air jet 93 located on the outer face of the carburetor 94 and into the atmosphere or if equipped air filter box (not shown).

Figure 9:
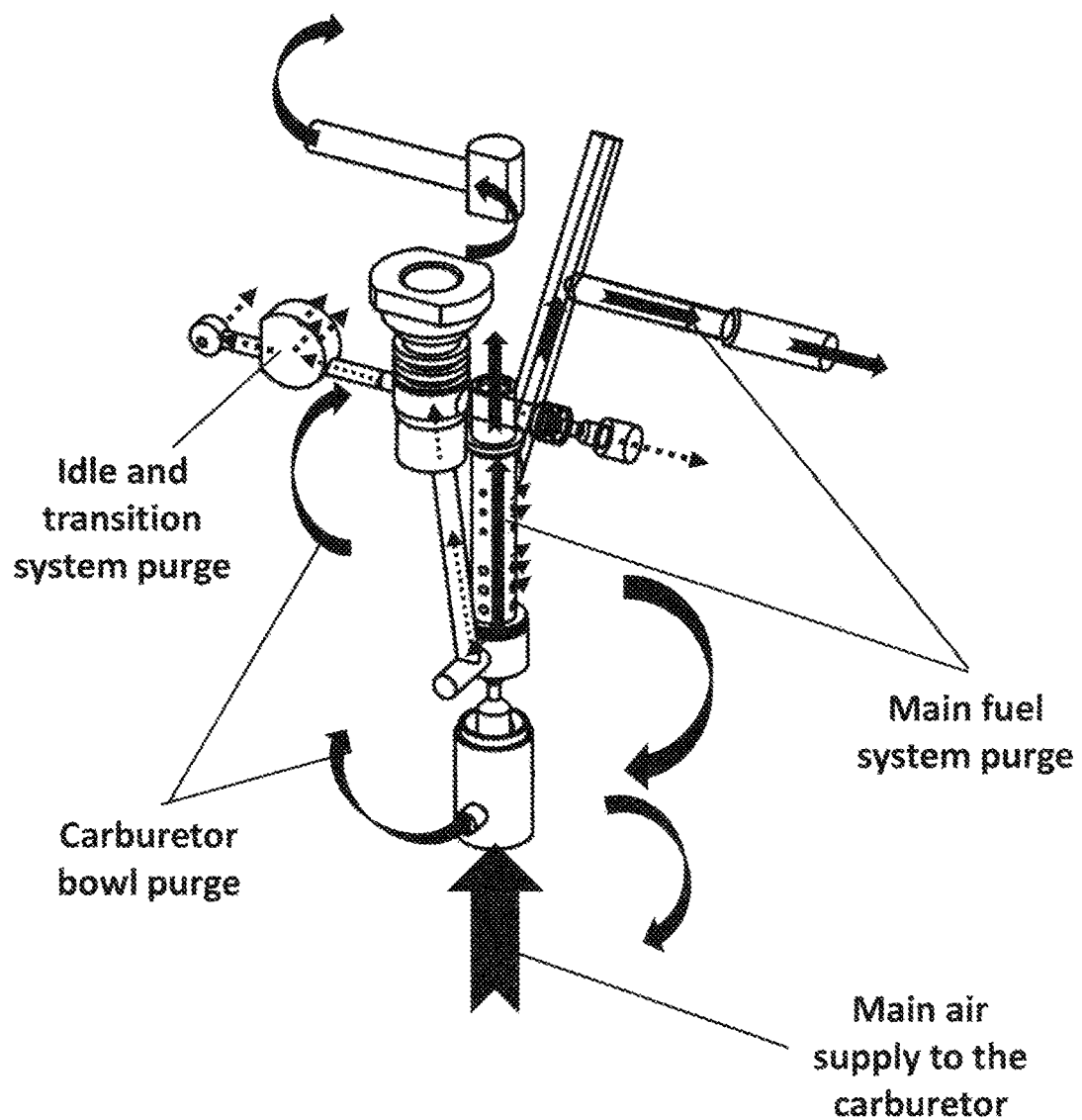
FIG. 9 is an internal view of the carburetor with highlighted all carburetor systems jets and passages circuits.

It is necessary to mention that all four carburetor systems: bowl, idle, transition and main system get purged at the same time with multiple short blasts of compressed air or spray can solvent. FIG. 9 summarizes the purging of the carburetor systems:

d. Carburetor bowl purging is represented with circle full arrow lines e. Idle and transition fuel system purging are represented with straight dashed arrow lines f. Main fuel system purging is represented with straight full arrows lines.

Motorcycle Float Type Carburetor Purge

Figure 10A:
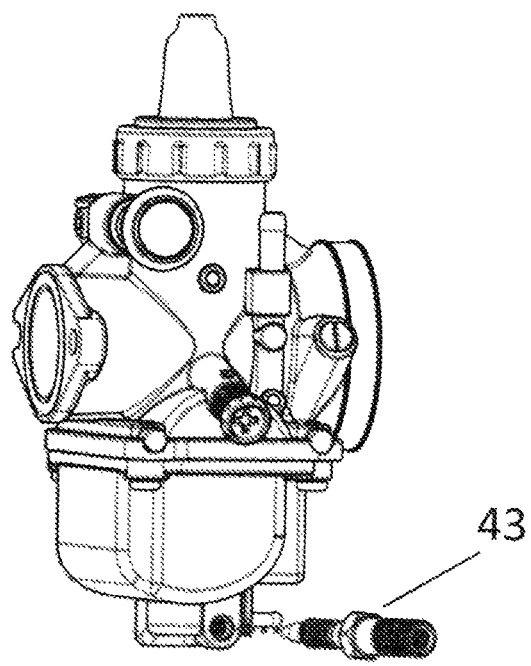
FIG. 10a shows the carburetor bowl retaining screw installation point on the carburetor for the motorcycles.

In case of the motorcycle float type carburetor, the drain screw/plug 10 gets replaced with the purge valve assembly, FIG. 10a.

Figure 10B:
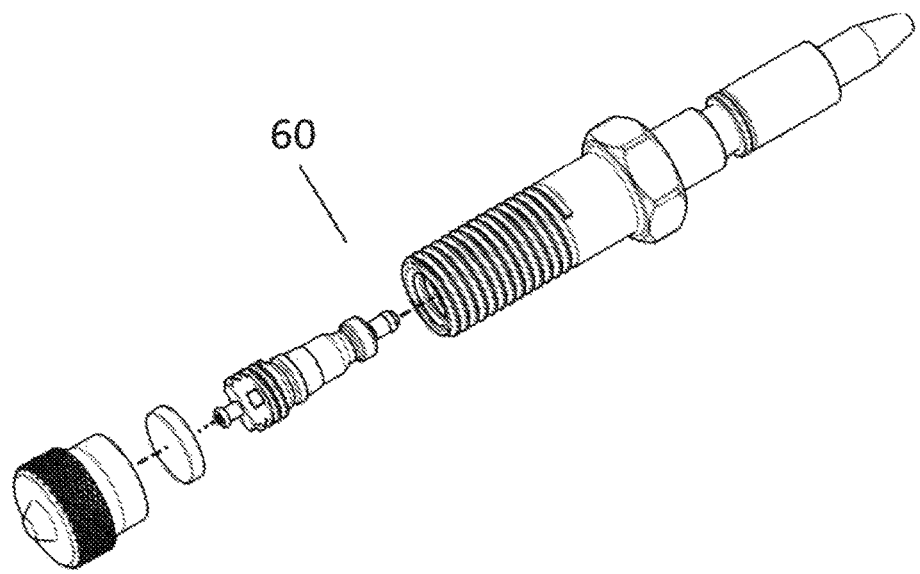
FIG. 10b shows the purge valve location installation on the carburetor for the motorcycles.
Figure 10C:
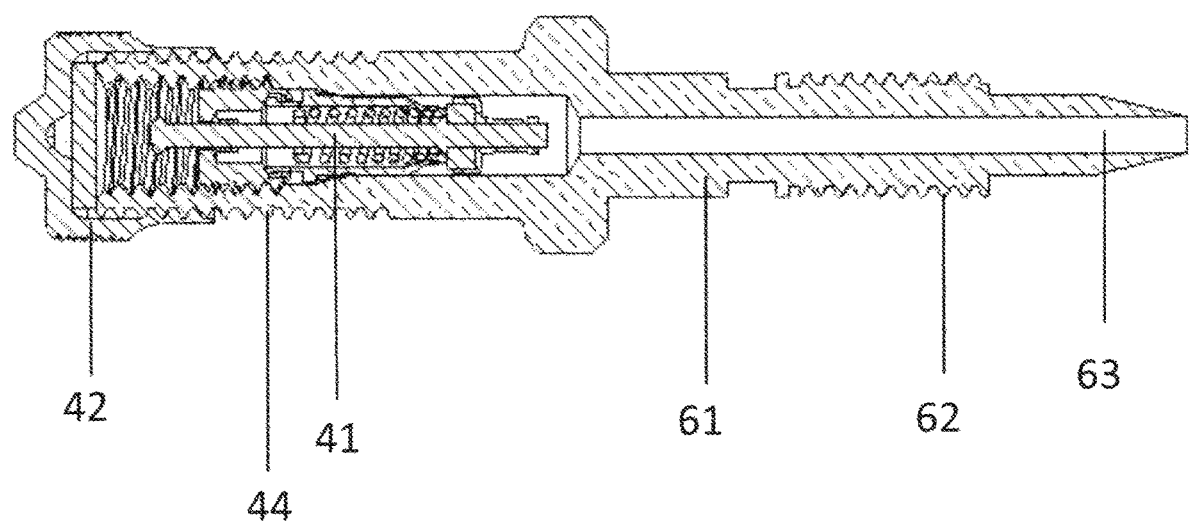
FIG. 10c shows the sub-components of the motorcycle type purge valve assembly 60 which consist of the valve core 41, the valve cap 42, a standardized threaded section 44, a metal tube 61, a customized threaded section 62 and a orifice restriction passage 63.

Motorcycle type purge valve assembly is shown in FIGS. 10a, 10b and 10c. The assembly 60 consists of an externally threaded hollow cylindrical metal tube 61. The metal tube 61 is formed with a standardized threaded section 44 and cap 42 on one side. The customized threaded section 62 of the metal tube on the other side is made to fit within an outlet of the motorcycle type engine carburetor bowl drain plug 10. The orifice restriction passage 63 is located on the customized threaded side.

The motorcycle type carburetor is a very similar design as the float type carburetors for the power equipment, FIG. 11a. Once connected to the pressure source through the connecting fitting 50 and purge valve 43 the air pressurizes the inside of the carburetor bowl 11. FIG. 11b shows detailed cross section of the bowl cavity 70 and the fuel jets. The pressurized gas from inside the bowl cavity 70 removes the remaining fuel from inside the main jet 4, emulsion tube 3 and idle jet 19. On its way out of the emulsion chamber 91, the air scrubs off the remaining fuel and ethanol film from the passage 82 to the idle tiny opening 84 all the way to the carburetor main flow cavity 85. On the opposite side, the air escapes through the main system air jet passage 93b into the atmosphere or if equipped air filter box (not shown).

In case the fuel supply valve to the carburetor (not shown) is left open the air from inside the bowl escapes through the needle valve sit 76 and fuel delivery port 7 into the fuel tank (not shown). For this purpose, entire amount of fuel has to be drained from the fuel tank before the purging.

Diaphragm Type Carburetor Purge

Small hand-held power equipment uses diaphragm type carburetors (carburetor that can operate in any position even upside down). Diaphragm type carburetors can be found and on other types of engines like engines for watercrafts or airplanes.

To separate the fuel tank 110 from the carburetor 1 so the inside of the carburetor can be pressurized, a three-way valve 57 can be installed on the fuel feed line 55, FIG. 12a. One of the ports of the three-way valve is connected to the purge valve 43, FIG. 12b. For engine operation the three-way valve 57 connects the carburetor inlet port 1a to the fuel tank. With the three-way valve in the other position the fuel tank gets disconnected from the carburetor while the purge valve 43 gets connected to the inlet port 1a of the carburetor allowing the pressurized gas from the can to reach the carburetor but not and the fuel tank.

The purge valve 43 used on the diaphragm carburetors is of the same kind as the purge valve used on the float type carburetors for the power equipment machinery.

Alternatively, the three-way valve can be replaced with a two-way valve 58 and a hose fitting tee 59. With this arrangement, the purge valve 43 is connected to one of the tee fitting 59 end, FIG. 12c. With the two-way valve 58 on the fuel from the tank can reach the carburetor allowing engine proper operation. To purge the carburetor, is necessary to turn the two-way valve 58 off. This way the pressurized gas from the can pressurizes the carburetor only and not and the fuel tank.

While keeping the tee fitting the same, the two-way valve 58 can be replaced with check valve 56. During engine operation the check valve allows fuel to flow straight from the tank to the carburetor. During purging, the check valve will allow the gas to flow only to the carburetor FIG. 12d.

Finally, the carburetor can be pressurized without any type of valves installed but for this system the fuel hoses from the carburetor ports 1a and 1b have to be disconnected. Pressurized can 51 hose 50b attaches directly to the carburetor inlet port 1a, FIG. 12e.

With either of the arrangements, once activated, the pressurized gas from the can flows through the purge valve into the carburetor through the fuel inlet port 1a and into the diaphragm type pump 114. FIG. 12f shows the cross section of the diaphragm type carburetor. On its way through the carburetor, the gas flows through the pump's inlet check valve 112 then out of the pump chamber through the outlet check valve 113. The pressurized gas opens the spring 119 loaded control valve 115 and from there the gas flows inside the fuel metering chamber 116. At the time of the purge process, because of the high pressure inside the chamber the cover plate 117 protects the diaphragm 118 of the metering chamber 116 from rupture. Part of the flow pushes the fuel through the idle and the transfer system jet 121 and the main jet 122 into the main carburetor air/fuel mixing chamber/passage (Venturi) 85. The rest of the flow pushes the liquid fuel out of the carburetor through the outlet fuel port 1b and/or through the primer bulb (if equipped) 126.

If equipped with a primer bulb 126, on its way out of the carburetor the gas flows through the primer bulb chamber inlet valve 123 and outlet valve 124. The entire amount of liquid fuel and ethanol get purged out through the carburetor outlet port (1b) into the fuel tank. Manual activation of the primer bulb 126 can help establish initial pressurized gas flow through the carburetor, FIG. 12g.

SUMMARY

The method of purging the carburetor described is so great that thoroughly cleans the entire interior of the carburetor.

The unique construction of the purge valve provides flush non-protruding abutment within the carburetor casing or fuel feed line, not interfering with the carburetor operation. Additional advantages include that the purge valve is easily attachable and removable from the carburetor but most importantly finally permits commercial disconnect compressed air attachments to be used in purging carburetors.

While particular embodiments of the invention have been illustrated and described, it will be apparent to those skilled in the art that various changes and modifications can be made without departing from the spirit and scope of the invention. The final result is that the efficiency of purging of the inside of carburetors is so great it leaves carburetors like in new condition.

I claim:

1. A method of purging the inside of a carburetor comprising;
    a. attaching a permanent carburetor attachment device with one end threaded for clockwise turn into a threaded receiver inside the carburetor;
    b. attaching a second end of the attachment device with a receiving extension with quick connect one-way pneumatic tire valve to a compressed air source;
    c. influencing the flow of compressed air with a flow limiting orifice in the attachment device in series with the quick connect one-way pneumatic tire valve inside the attachment device that has an open channel to the carburetor through the threaded end of attachment device;
    d. to use, a fuel shut off valve on the carburetor as a receiving port for the attachment device is closed;
    e. purging starts when compressed air or pressurized solvent is delivered through the attachment device quick connect one-way pneumatic tire valve into the carburetor;
    f. the source of compressed air or pressurized solvent has the same fittings as a conventional car tire air nozzle;
    g. purging continues with multiple short blasts of compressed air or pressurized solvent sent through the attachment device into the carburetor.

2. The method of claim 1 wherein the attachment device is not permanent.

3. The method of claim 1 wherein the attachment devices connect to a fuel feed line port.

4. The method of claim 1 wherein a permanently installed shut off two-way valve is attached to the fuel feed line with attachment device installed into one port of the two-way valve.

5. The method of claim 1 wherein a permanently installed shut off three-way valve is attached to the fuel feed line with attachment device installed in one port of the three-way valve.

6. The method of claim 1 wherein a permanently installed shut off check valve is attached to the fuel feed line with a pneumatic one-way valve installed upstream of the check valve.

7. The method of claim 1 wherein a tee fitting is placed within the fuel feed hose with the one-way pneumatic valve installed upstream of the tee fitting.

8. The method of claim 1 wherein a pressurized can is equipped with a release valve and a hose and tire inflator nozzle head wherein the pressurized can's tire inflator nozzle is attached to fuel shut off valve on the carburetor instead of the quick connect one-way pneumatic tire valve inside the attachment device.

9. The method of claim 1 wherein a carburetor bowl fuel drain plug is left off while compressed air or pressurized solvent is delivered to the carburetor.

10. The method of claim 1 wherein fuel is drained from the carburetor through the attachment device once the one-way pneumatic valve is removed.

11. The method of claim 8 wherein the pressurized can is filled with Halocarbon 152A (R-152a), Hydrofluorocarbon-134a (R-134a), propane, butane gas or any other gases or mixture of gases and liquids.

12. The method of claim 8 wherein the contents of the pressurized can are mixed with an anti-corrosive additive.

13. The method of claim 8 wherein a small amount of mineral oil is mixed in with the contents of the pressurized can.

14. The method of claim 1 wherein a diaphragm type carburetor primer bulb is manually activated to establish initial pressurized gas flow.

\* \* \* \* \*